United States Patent
Tho et al.

(10) Patent No.: US 8,348,192 B2
(45) Date of Patent: Jan. 8, 2013

(54) CRASH ATTENUATION SYSTEM FOR AIRCRAFT

(75) Inventors: Cheng-Ho Tho, Arlington, TX (US);
Michael R. Smith, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 473 days.

(21) Appl. No.: 12/679,563

(22) PCT Filed: Oct. 22, 2007

(86) PCT No.: PCT/US2007/082140
§ 371 (c)(1),
(2), (4) Date: Mar. 23, 2010

(87) PCT Pub. No.: WO2009/054844
PCT Pub. Date: Apr. 30, 2009

(65) Prior Publication Data
US 2010/0206983 A1 Aug. 19, 2010

(51) Int. Cl.
*B64C 25/56* (2006.01)
(52) U.S. Cl. .................. 244/100 A; 244/17.17; 244/139
(58) Field of Classification Search .............. 244/17.17, 244/100 A, 100 S, 107, 139, 121, 138 R
See application file for complete search history.

(56) References Cited

U.S. PATENT DOCUMENTS

| 3,602,661 | A | | 8/1971 | Liedberg |
| 3,990,658 | A | | 11/1976 | Letsinger |
| 4,004,761 | A | | 1/1977 | McAvoy |
| 4,032,088 | A | * | 6/1977 | McAvoy ................ 244/100 A |
| 4,657,516 | A | * | 4/1987 | Tassy .......................... 441/125 |
| 5,259,574 | A | | 11/1993 | Carrot |
| 5,407,150 | A | * | 4/1995 | Sadleir ...................... 244/12.4 |
| 5,560,568 | A | * | 10/1996 | Schmittle ...................... 244/48 |

(Continued)

FOREIGN PATENT DOCUMENTS
DE 4118300 A1 12/1992
(Continued)

OTHER PUBLICATIONS

Notification of the Decision to Grant a Patent Right for Patent for Invention issued by the Patent Office of the People's Republic of China for related Chinese Patent Application No. 200680041870.7 on Jan. 21, 2012.

(Continued)

*Primary Examiner* — Christopher P Ellis
*Assistant Examiner* — Medhat Badawi
(74) *Attorney, Agent, or Firm* — James E. Walton; J. Oliver Williams

(57) ABSTRACT

A crash attenuation system for an aircraft, the system having an airbag carried by the aircraft and inflatable generally adjacent an exterior of the aircraft. The airbag has at least one vent for releasing gas from the interior of the airbag. A gas source is in fluid communication with the interior of the airbag for inflating the airbag with gas generated provided by the first gas source. A vent valve is provided for controlling a flow of gas through each vent, each vent valve being selectively configurable between an open state, in which gas can pass through the associated vent from the interior of the airbag, any number of intermediate states, in which the vent is partially open, and a closed state, in which gas is retained within the interior of the airbag.

20 Claims, 11 Drawing Sheets

U.S. PATENT DOCUMENTS

| | | | | |
|---|---|---|---|---|
| 5,765,778 | A * | 6/1998 | Otsuka | 244/101 |
| 5,836,544 | A * | 11/1998 | Gentile | 244/17.17 |
| 5,992,794 | A * | 11/1999 | Rotman et al. | 244/17.17 |
| 6,070,546 | A * | 6/2000 | Downey et al. | 114/123 |
| 6,158,691 | A | 12/2000 | Menne et al. | |
| 6,273,463 | B1 * | 8/2001 | Peterson et al. | 280/739 |
| 6,338,456 | B1 * | 1/2002 | Cairo-Iocco et al. | 244/139 |
| 6,439,256 | B2 * | 8/2002 | Koelsch et al. | 137/68.13 |
| 6,648,371 | B2 * | 11/2003 | Vendely et al. | 280/739 |
| 6,820,898 | B2 * | 11/2004 | Dinsdale et al. | 280/737 |
| 6,886,776 | B2 * | 5/2005 | Wagner et al. | 244/12.4 |
| 7,232,001 | B2 * | 6/2007 | Hakki et al. | 180/271 |
| 7,954,752 | B2 * | 6/2011 | Smith et al. | 244/17.17 |
| 2003/0062443 | A1 | 4/2003 | Wagner et al. | |
| 2005/0077426 | A1 | 4/2005 | Simard | |

FOREIGN PATENT DOCUMENTS

| | | |
|---|---|---|
| EP | 1403180 A2 | 3/2004 |
| JP | 5322496 A | 12/1993 |
| JP | 8192797 | 7/1996 |
| JP | 11268605 A | 10/1999 |
| WO | 2006046038 A2 | 5/2006 |

OTHER PUBLICATIONS

First Office Action in Chinese Application No. 200680041870.7, by the Chinese Patent Office, dated Apr. 29, 2011.

First Examination Report from Corresponding Mexican Application No. MX/a/2008/0060008, dated Mar. 22, 2011; Received in office Apr. 6, 2011.

Second Examination Report from Corresponding Canadian Application No. 2,628,380, dated Feb. 8, 2011.

Extended European Search Report dated Aug. 6, 2012 from related European Patent Application No. 07844510.3.

Reaps Rotorcraft Protection, Brochure by Rafael Armament Development Authority, Ltd., Ordnance Systems Division, Haifa, Israel.

Kevin Coyne, F-111 Crew Module Escape and Survival Systems, pp. 1-10, http://www.f-111.net/ejection.htm.

"CABS Cockpit Air Bag System," Armor Holdings Aerospace & Defense Group, Jan. 2006.

Akif Bolukbasi, "Active Crash Protection Systems for UAVs," American Helicopter Society Annual Forum 63 Proceedings, Virginia Beach, VA, May 1-3, 2007.

Akif Bolukbasi, "Active Crash Protection Systems for Rotorcraft," Center for Rotorcraft Innovation/National Rotorcraft Technology Center Program 2007 Year End Review, Phoenix, AZ, Feb. 19-20, 2008.

Specification for PCT/US09/51821 filed on Jul. 27, 2009.

Response to Invitation to Correct Defects for PCT/US09/51821 dated Sep. 16, 2009.

International Search Report for PCT/US09/51821 dated Sep. 11, 2009.

Specification for PCT/US06/43706 filed Nov. 8, 2006.

Response to Invitation to Correct Defects for PCT/US06/43706 dated Apr. 7, 2008.

Publication of PCT/US06/43706 dated May 8, 2008.

Search Report for PCT/US06/43706 dated Jul. 18, 2008.

International Preliminary Report on Patentability for PCT/US06/43706 dated Mar. 19, 2009.

Office Action from Canadian Application No. 2,628,380, dated Dec. 23, 2009.

First Office Action from application 2007801012216. Issued from the Chinese Patent Office dated Apr. 27, 2012, 5 pages.

Rejection Notice for Japanese Application No. 2008-542336, dated Feb. 23, 2011, 1 page.

* cited by examiner

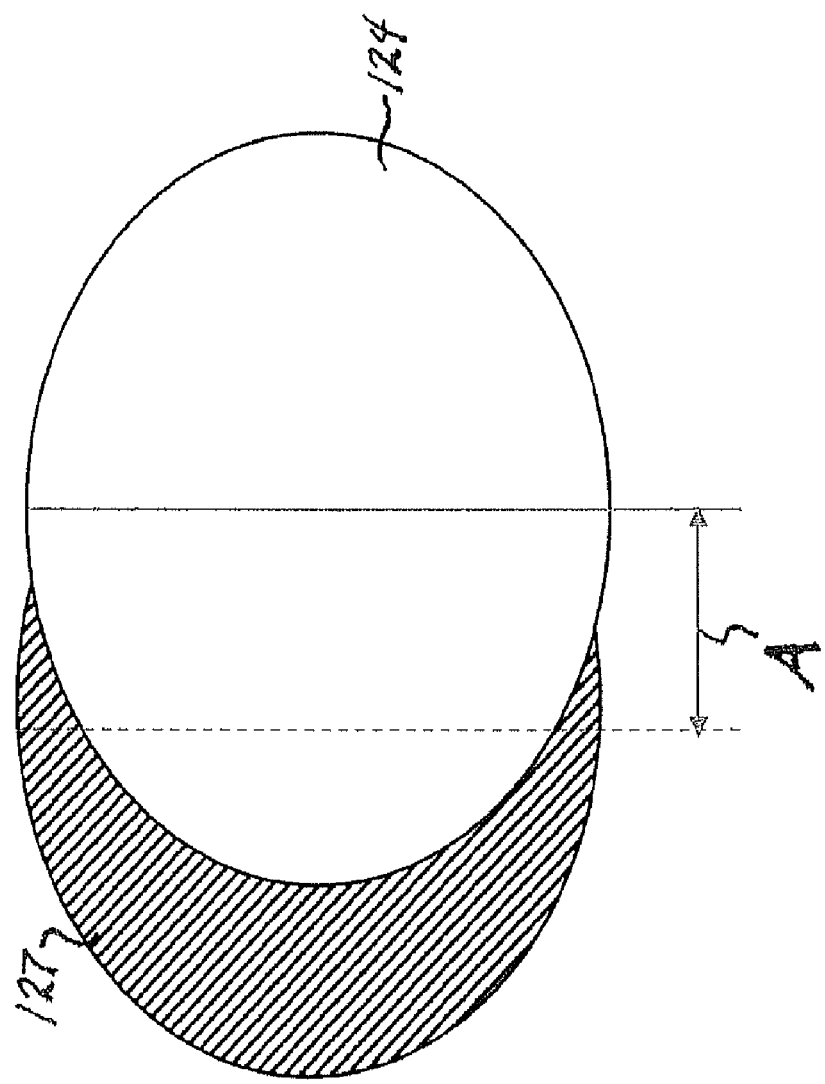

US 8,348,192 B2

CRASH ATTENUATION SYSTEM FOR AIRCRAFT

TECHNICAL FIELD

The present invention relates generally to crash attenuation systems and specifically to crash attenuation systems for use in aircraft.

DESCRIPTION OF THE PRIOR ART

Currently internal airbags are used in the automotive industry within the occupied volume to mitigate occupant injuries. Similarly, external airbags have been used to attenuate decelerative loads to air and space vehicles, such as escape modules, upon contact with the ground or water. Examples include the NASA Mars Rovers and the crew module of the General Dynamics/Grumman F-111.

During impact, the gas in the airbag must be vented to prevent gas pressurization and subsequent re-expansion, which may cause the occupant to accelerate backward. This effect is commonly known as rebound. In addition, the gas may be vented to prevent over-pressurization, which can cause failure of the airbag. Venting may be accomplished, for example, through discrete vents or through a porous membrane that forms at least a portion of the skin of the airbag.

One shortcoming of prior external airbag systems is that they fail to prevent post-impact pitch-over, or "tumbling," of an aircraft having a forward and/or lateral velocity at impact with a hard surface. For example, referring to FIGS. 1a-1e, an aircraft 10 that is equipped with a prior external airbag system 12 is shown at different points during a crash sequence from (a) to (e). The crash sequence involves the aircraft 10 having both forward and downward velocities at (a) and (b). The airbag system 12 properly deploys its airbags 14 at (b), but still incurs serious damage due to pitch-over of the aircraft 10 as shown at (d) and (e). Thus, improvements are still needed in external airbag systems, particularly improvements to the pitch-over stability of an aircraft equipped with an external airbag system.

BRIEF DESCRIPTION OF THE DRAWINGS

For a more complete understanding of the present invention, including its features and advantages, reference is now made to the detailed description of the invention taken in conjunction with the accompanying drawings, in which.

DESCRIPTION OF THE PREFERRED EMBODIMENT

The present invention provides for an inflatable crash attenuation system for aircraft. The system comprises an airbag that is inflated prior to impact and controllably vented during impact so as to prevent aircraft pitch-over. The present invention may be used on all models of aircraft, for example, helicopter, fixed wing aircraft, and other aircraft, and in particular those that are rotorcraft. The system of the invention improves on the prior art by providing automatic control of the venting valves based on sensed crash conditions, thereby effectively shifting the center of impact pressure and preventing aircraft pitch-over.

Figure 1:
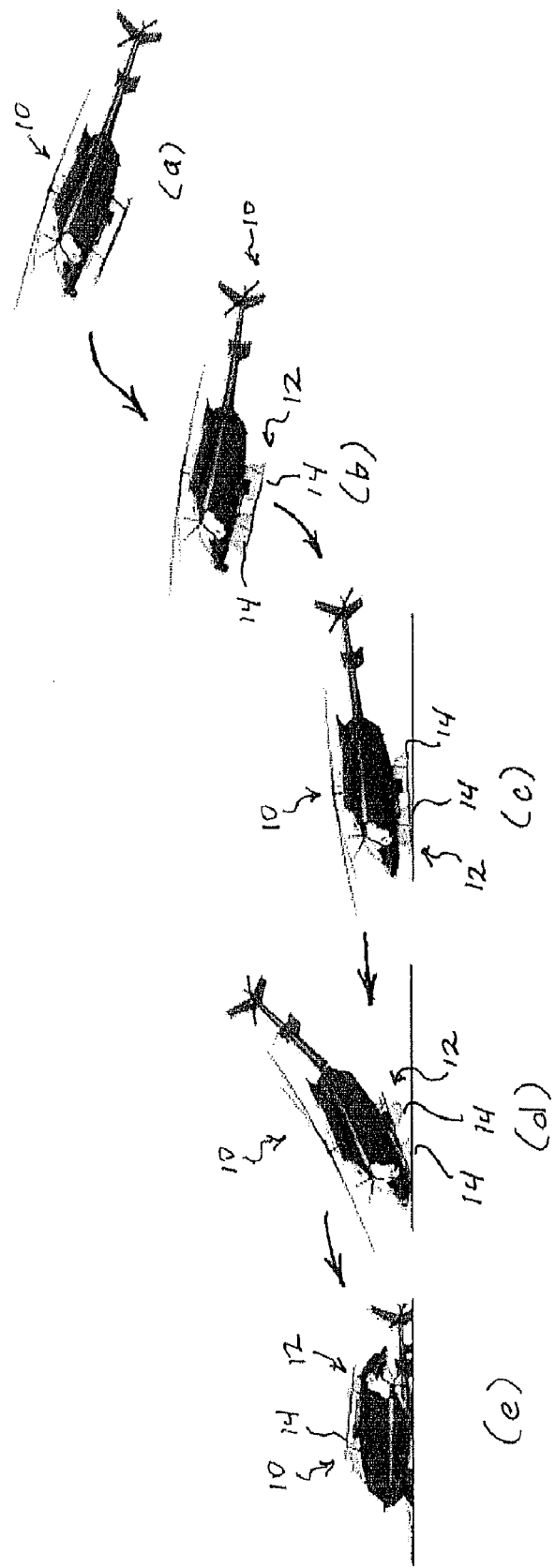
FIGS. 1a-1e show a crash sequence for a helicopter equipped with a prior external airbag system.
Figure 2:
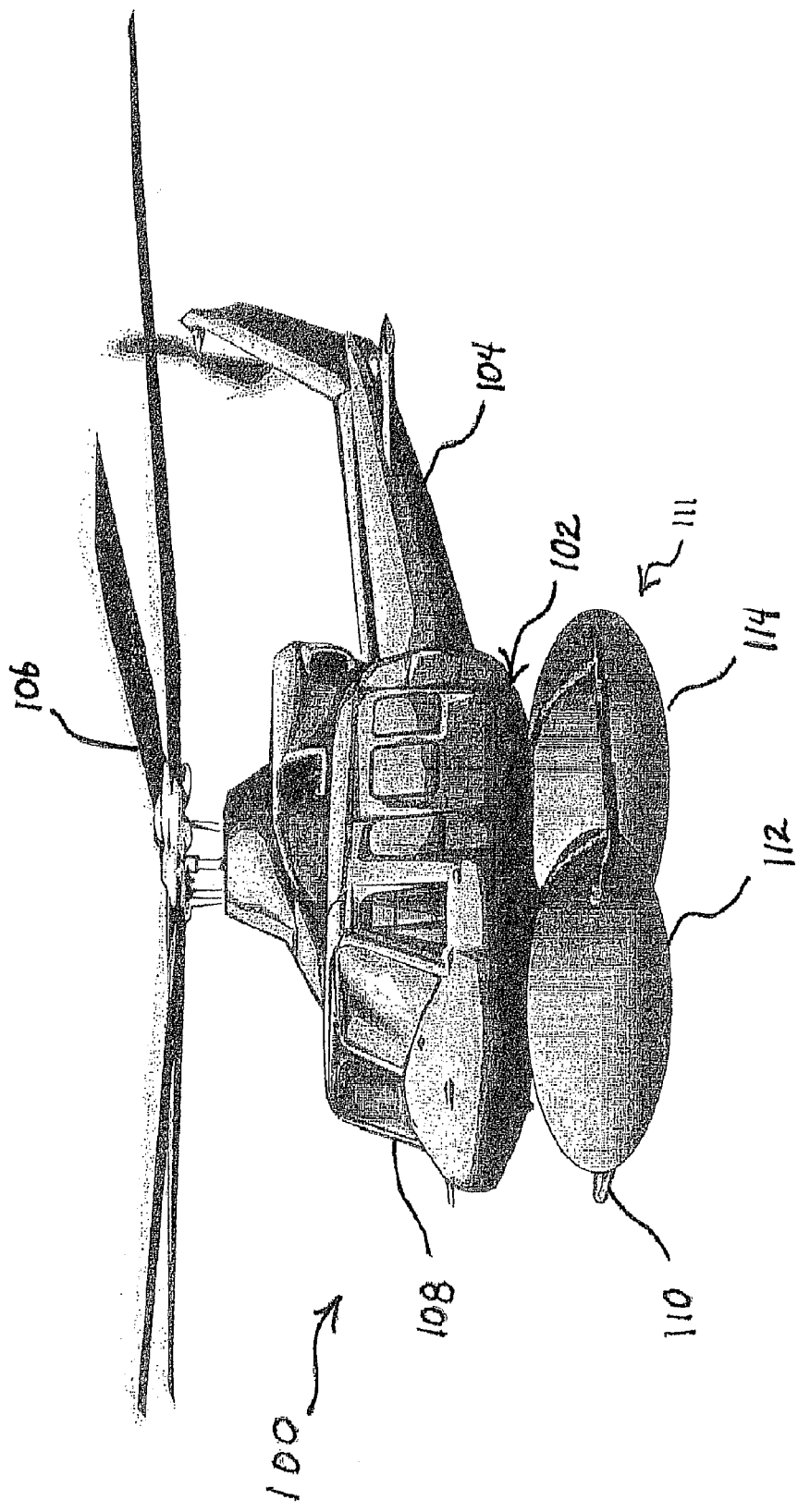
FIG. 2 is a perspective view of a helicopter equipped with an external airbag system.

FIG. 2 shows a helicopter 100 incorporating the crash attenuation system according to the present invention. Helicopter 100 comprises a fuselage 102 and a tail boom 104. A rotor 106 provides lift and propulsive forces for flight of helicopter 100. A pilot sits in a cockpit 108 in a forward portion of fuselage 102, and a landing skid 110 extends from a lower portion of fuselage 102 for supporting helicopter 100 on a rigid surface, such as the ground.

A problem with rotor 106 or the drive system for rotor 106 may necessitate a descent from altitude at a higher rate of speed than is desirable. If the rate is an excessively high value at impact with the ground or water, the occupants of helicopter 100 may be injured and helicopter 100 may be severely damaged by the decelerative forces exerted on helicopter 100. To reduce these forces, an airbag assembly 111 comprising inflatable, non-porous airbags 112, 114 is installed under fuselage 102. Though not shown in the drawings, airbags 112, 114 are stored in an uninflated condition and are inflated under the control of a crash attenuation control system (described below).

Figure 3:
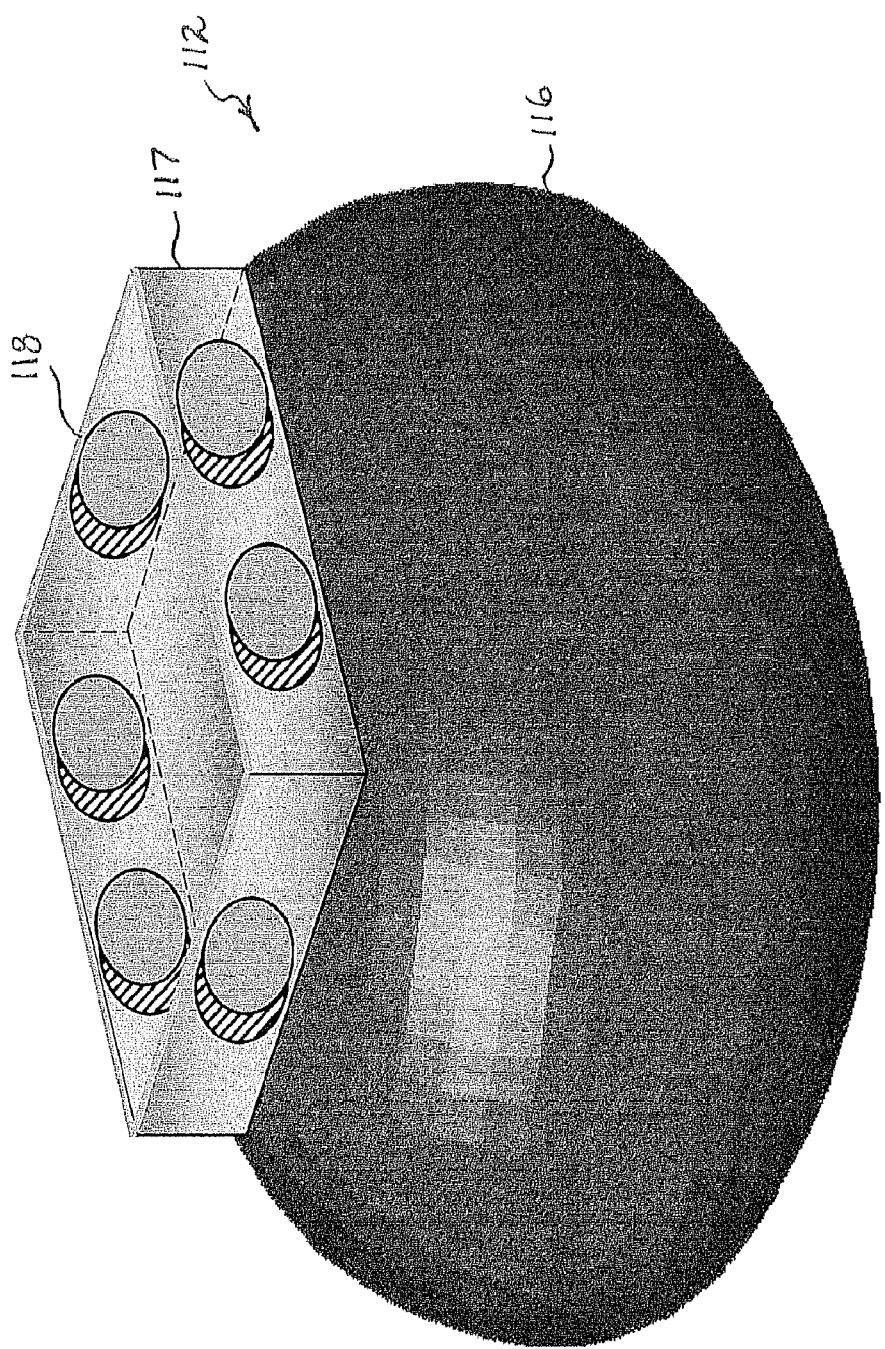
FIG. 3 is a perspective view of an airbag used with the external airbag system shown in FIG. 2.
Figure 4:
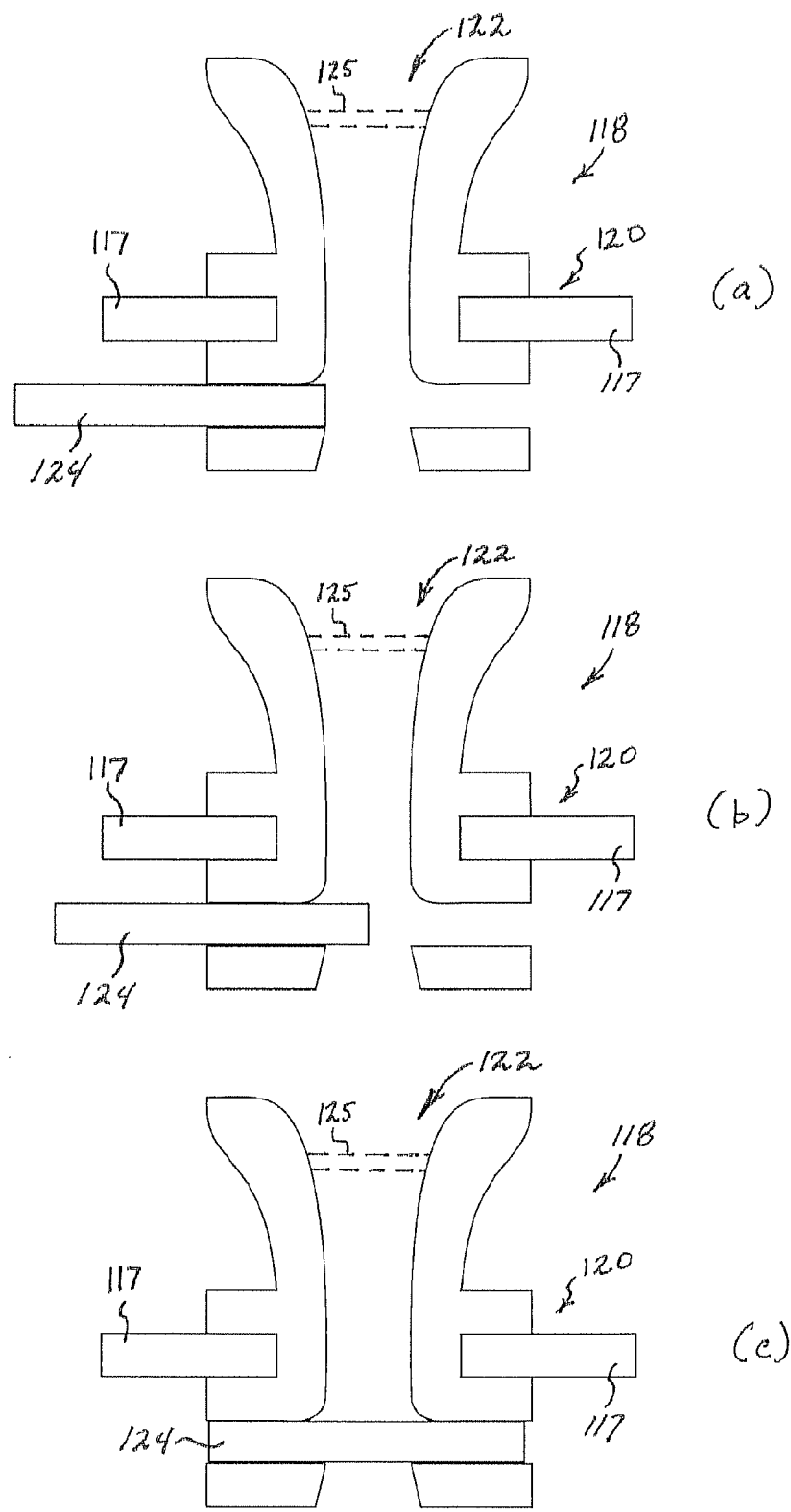
FIGS. 4a-4c are a cross-sectional views of a vent valve in full-open, partially-open, and closed configurations.

FIG. 3 is an enlarged view of airbag 112, which has a non-porous bladder 116, which is sealed to a housing 117 having a plurality of discrete vents 118. Airbag 112 is shown in FIG. 3, but it should be noted that airbags 112 and 114 can have generally identical configurations. In a preferred embodiment, the bladder 116 is formed of a fabric that comprises Kevlar and/or Vectran. Vents 118 communicate with the interior of bladder 116, allowing for gas to escape from within the airbag 112. In the embodiment shown, vents 118 are open to the ambient air, though vents 118 may be connected to a closed volume, such as another airbag or an accumulator (not shown). Also, while a plurality of vents are shown in the embodiment illustrated in FIG. 3, alternative embodiments can include only a single vent 118.

Figure 4A:
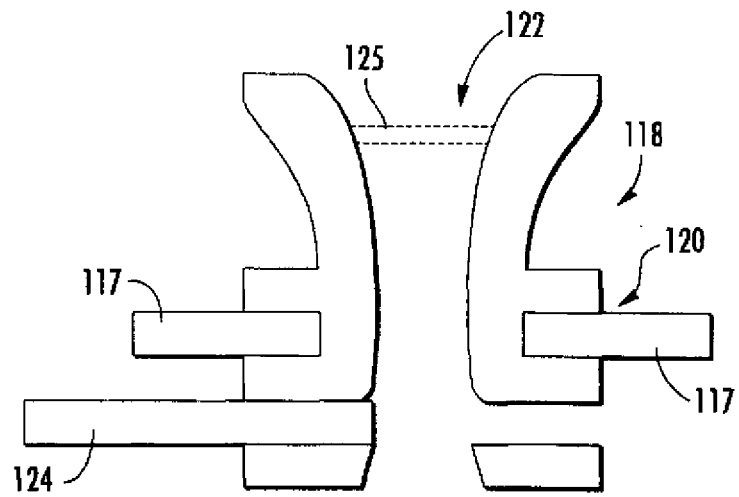
Figure 4B:
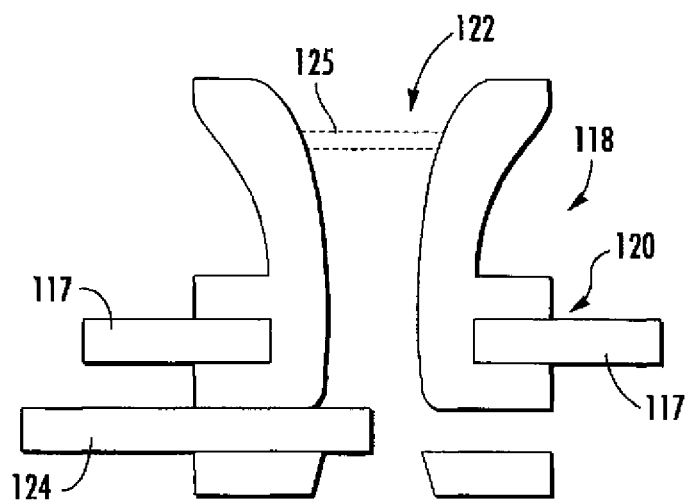
Figure 4C:
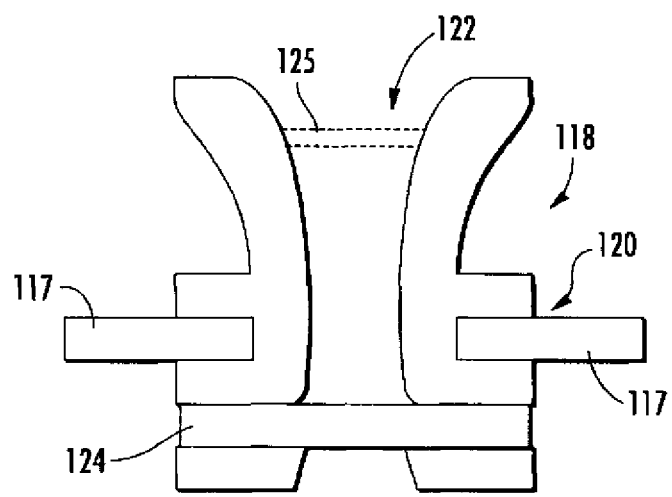

Referring to FIGS. 4a-4c, each vent 118 has a vent valve 120 for controlling the flow of gas through vent 118. Vent 118 and vent valve 120 together form a vent passage 122 for channeling gas flowing out of airbag 112. Each vent valve 120 is sealingly mounted in housing 117 (or bladder 116 in some embodiments) to prevent the leakage of gas around vent 118, which forces venting gas to flow through passage 122. A vent plate 124 is configured to be moveable between an open position, for example shown in FIG. 4a, at least one intermediate position, for example as shown in FIG. 4b, and a closed position, for example as shown in FIG. 4c. FIG. 4a shows vent plate 124 in the open position, or open state, in which a maximum amount of gas is allowed to flow through passage 122 from within airbag 112. FIG. 4b shows vent plate 124 in an intermediate position, or intermediate state, in which a selected amount of gas less than the maximum is allowed to flow through passage 122 from within airbag 112. FIG. 4c shows vent plate 123 in the closed position, or closed state, in which gas is prevented from flowing out of airbag 112 through the passage 122. Though only a single intermediate position is shown, it should be understood that various additional intermediate positions can be selected in order to control the amount of gas that is allowed to escape from within the airbag 112 through the vent 118. Also, while the vent valve 120 is shown as a sliding valve, it will be understood by one skilled in the art that vent valve 120 may alternatively be other suitable types of valves. Control of vent valves 120 may be accomplished though any number of means, including, for example, electrorheological means. In some embodiments, the vents 118 can be sealed with an optional pop-off pressure release mechanism, preferably a pressure sensitive fabric 125. In such embodiments, once the fabric 125 pops off, the vent valve 120 controls release of the pressurized air inside the airbag 112, 114.

Figure 5:
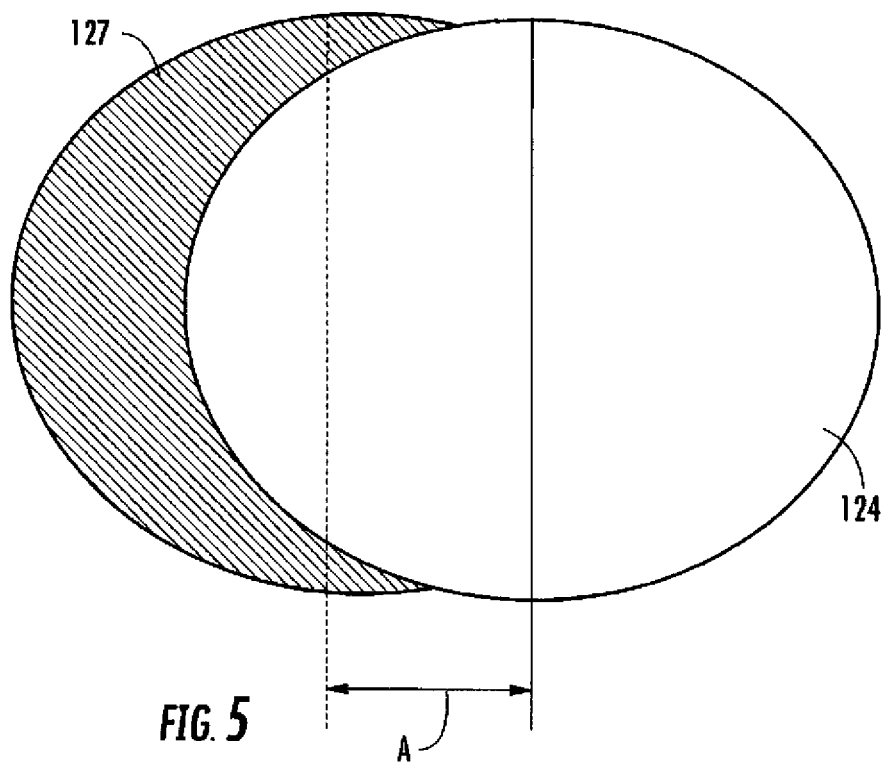
FIG. 5 is a diagram of the vent plate shown in FIGS. 4a-4c.
Figure 6:
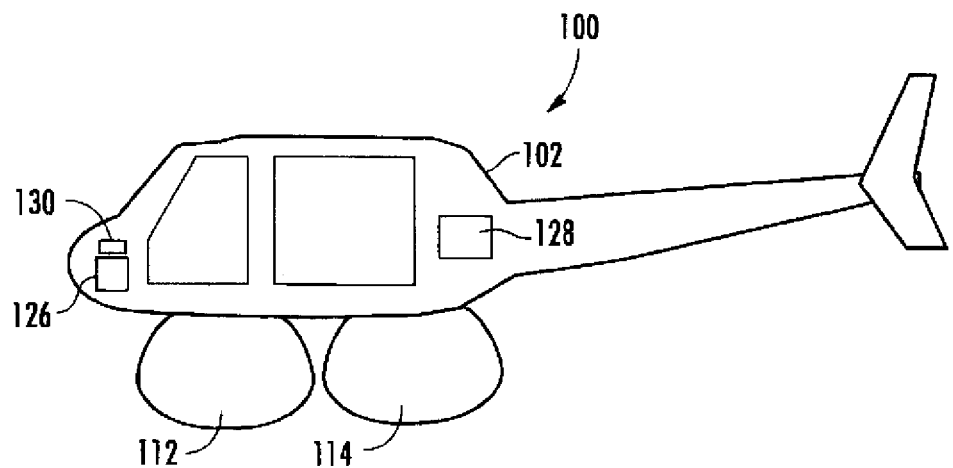
Figure 7:
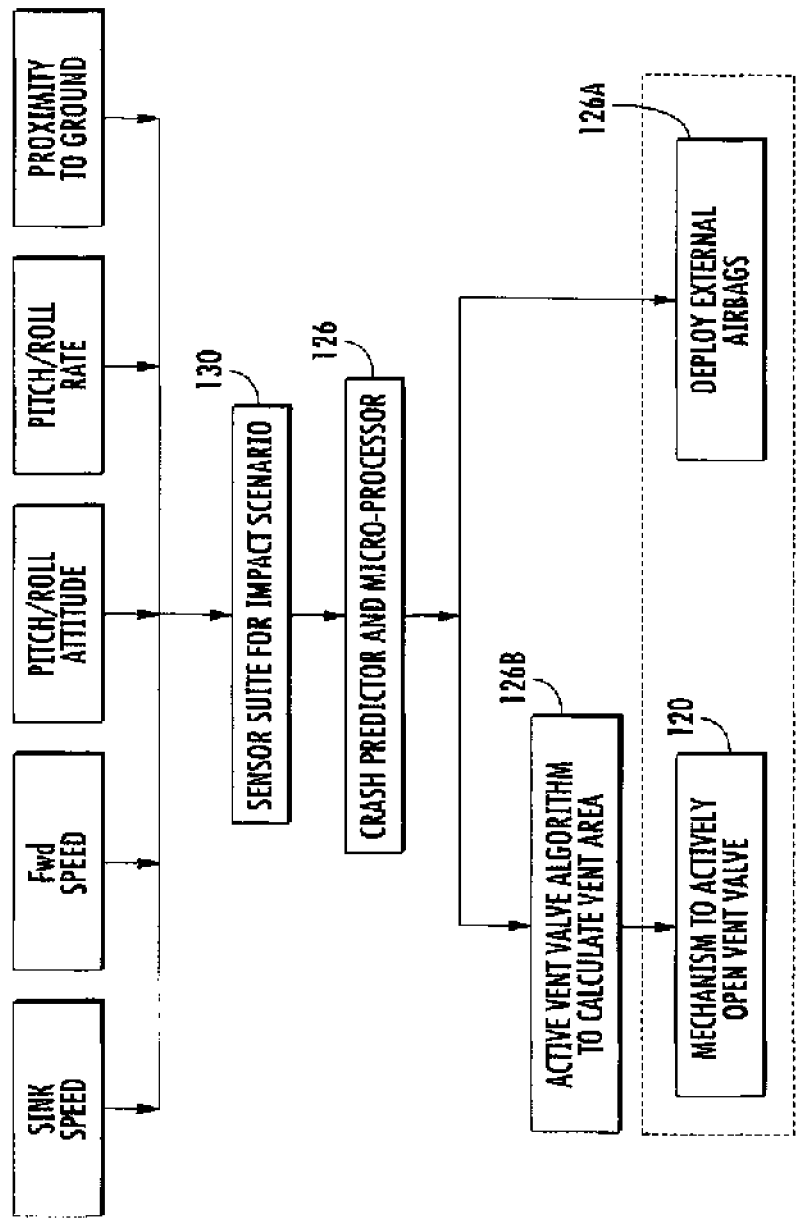
Figure 8:
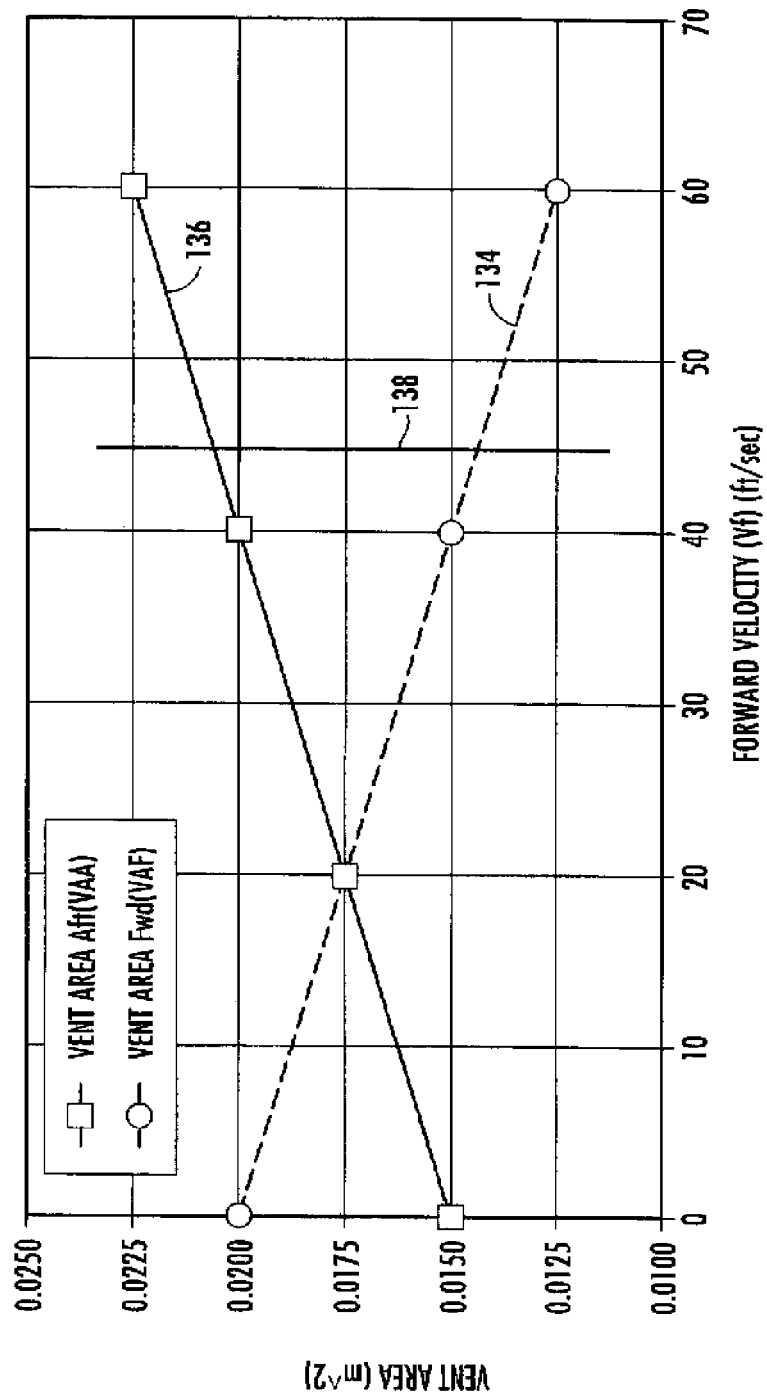
Figure 10:
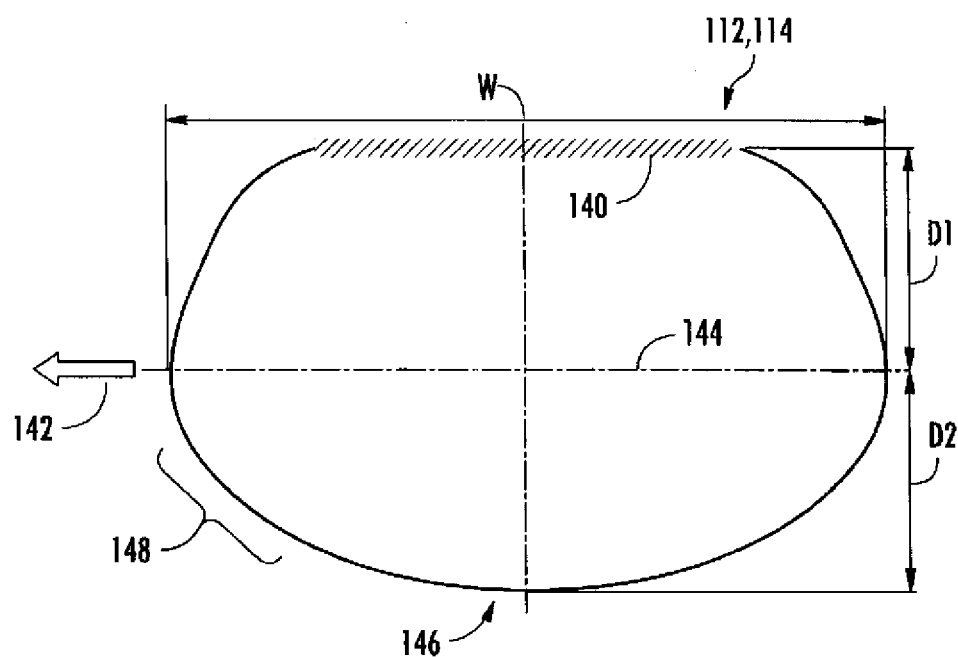
Figure 2:
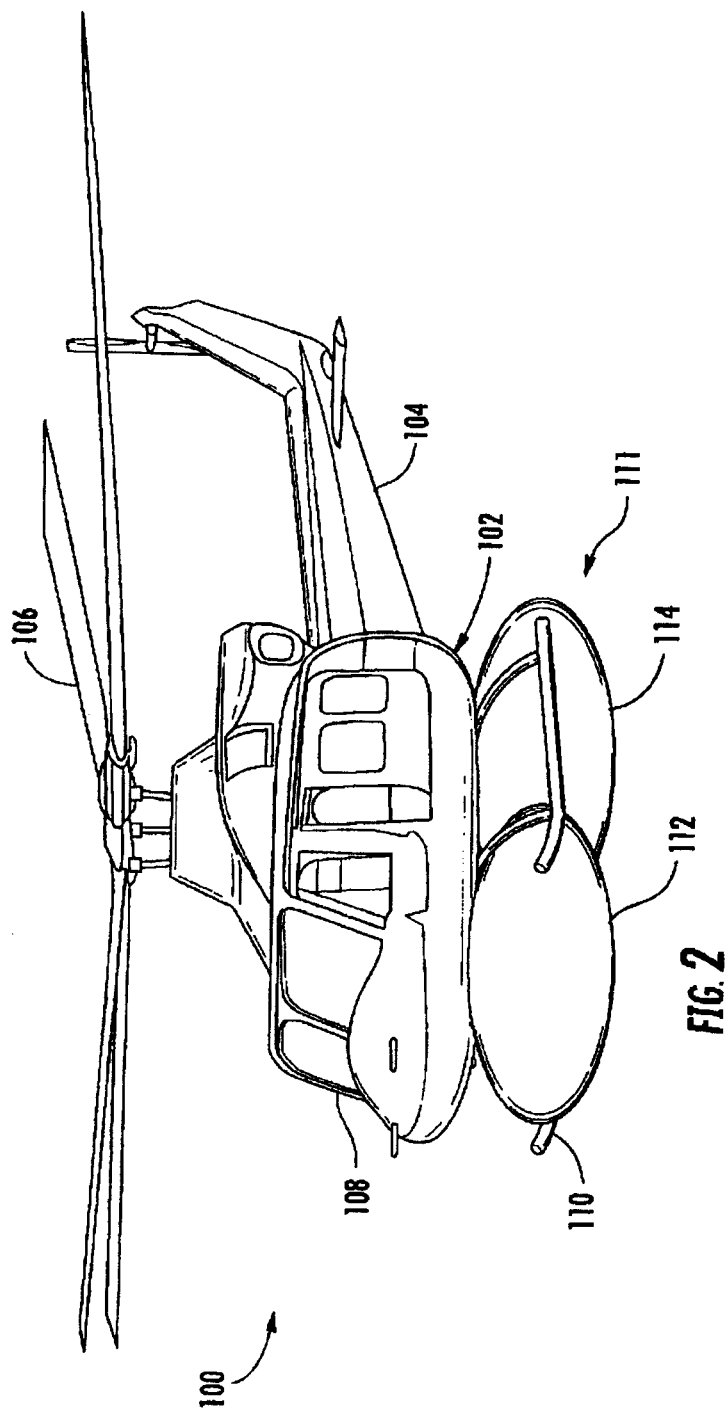
Figure 4A:
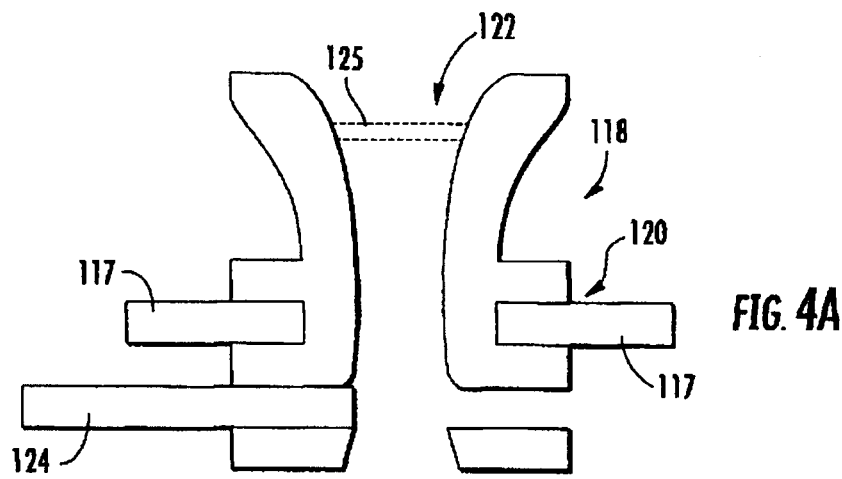
Figure 4B:
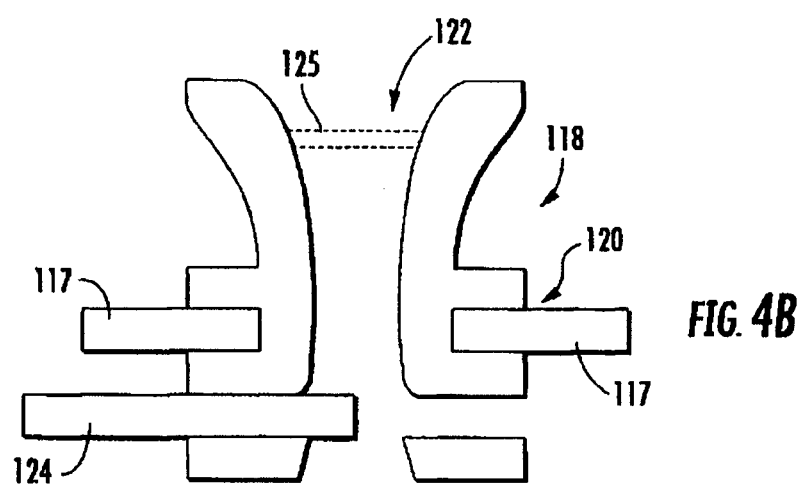
Figure 4C:
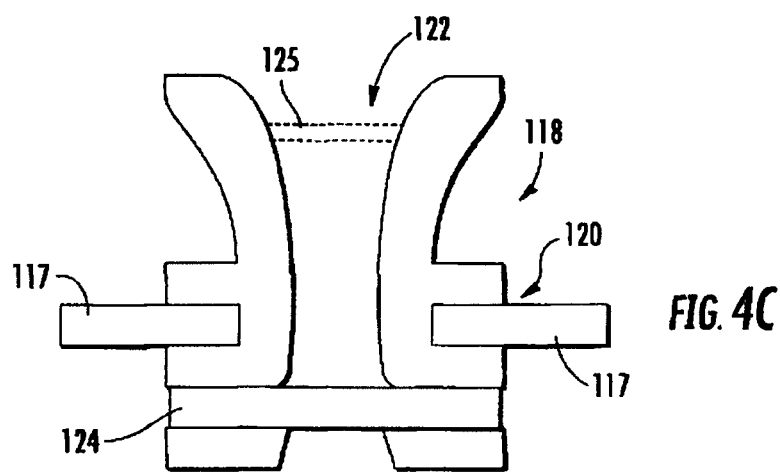
Figure 5:
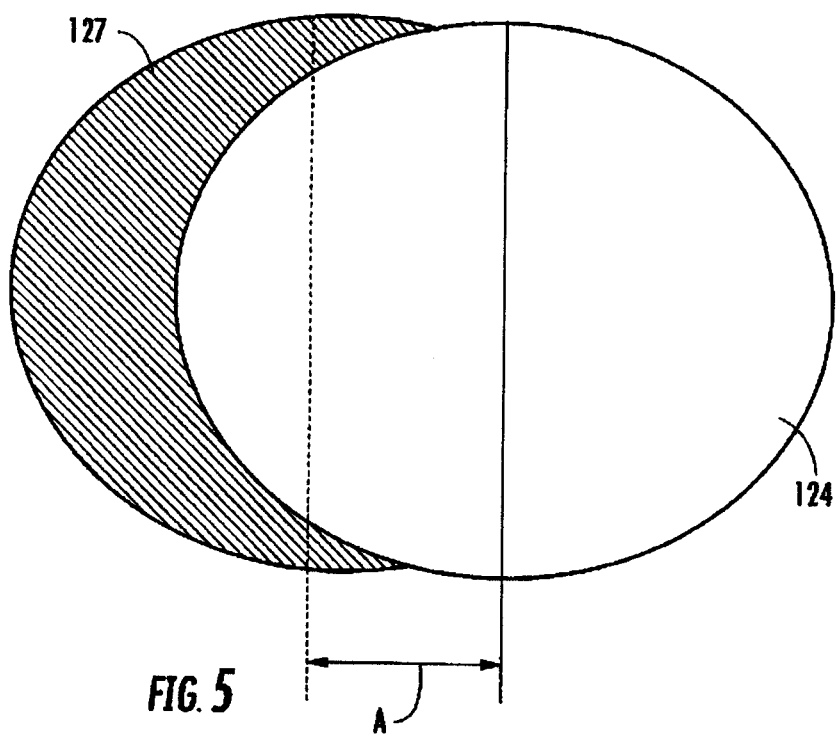
Figure 6:
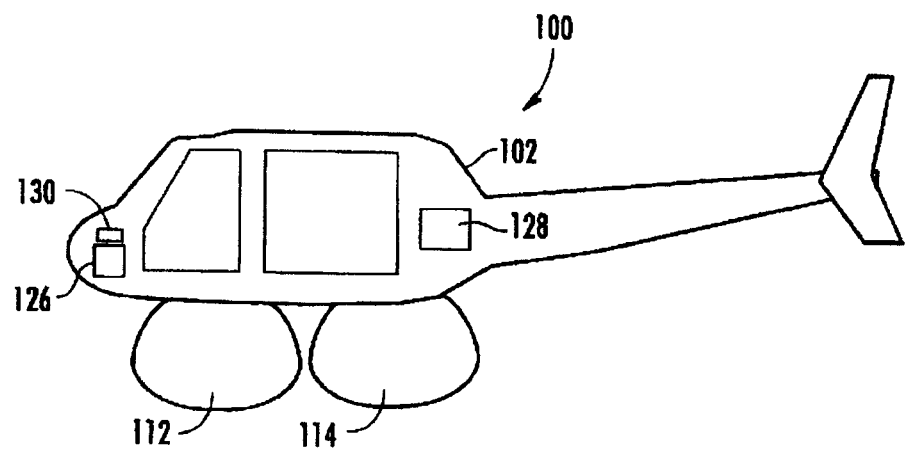
Figure 7:
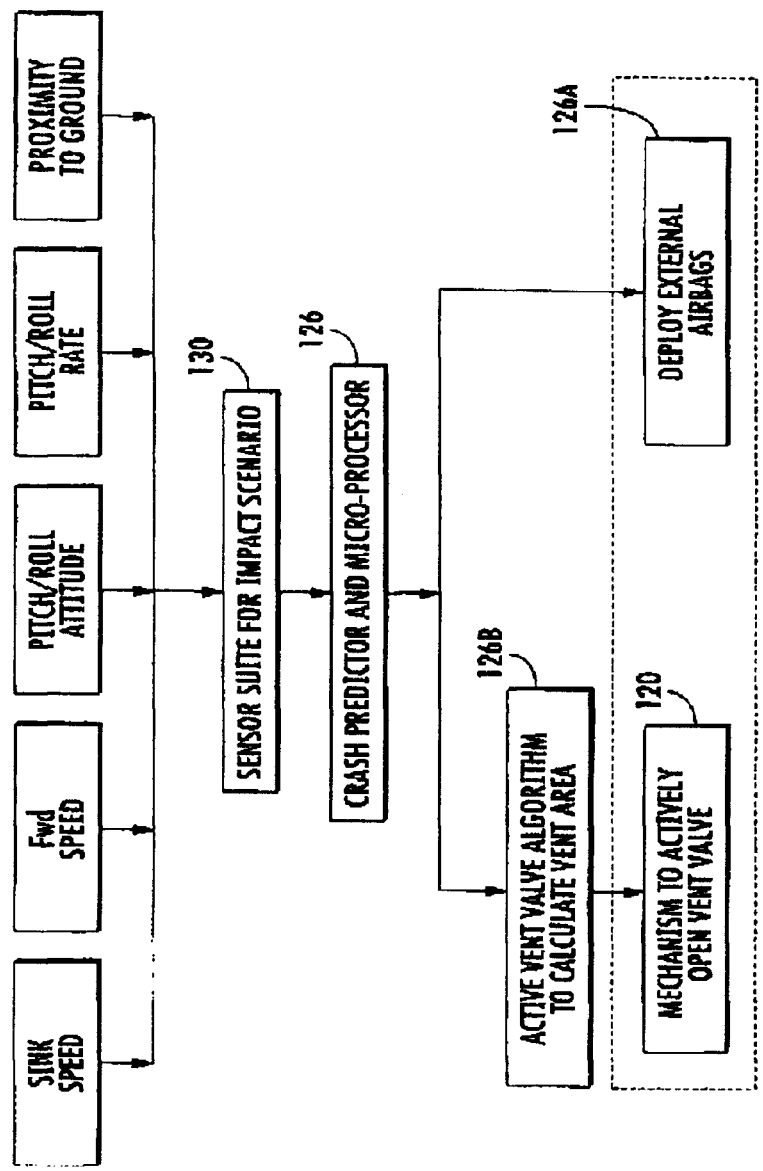
Figure 10:
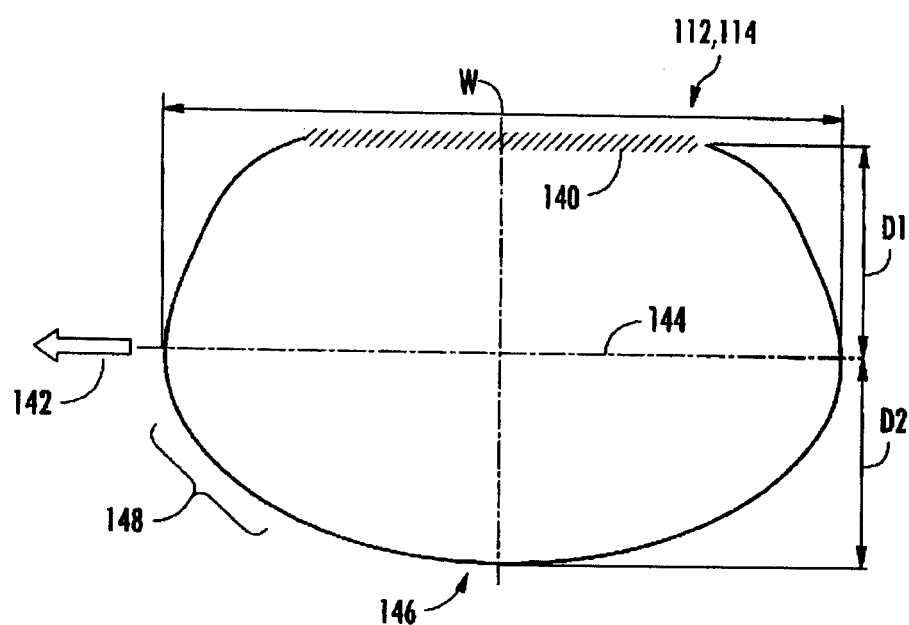
Figure 11:
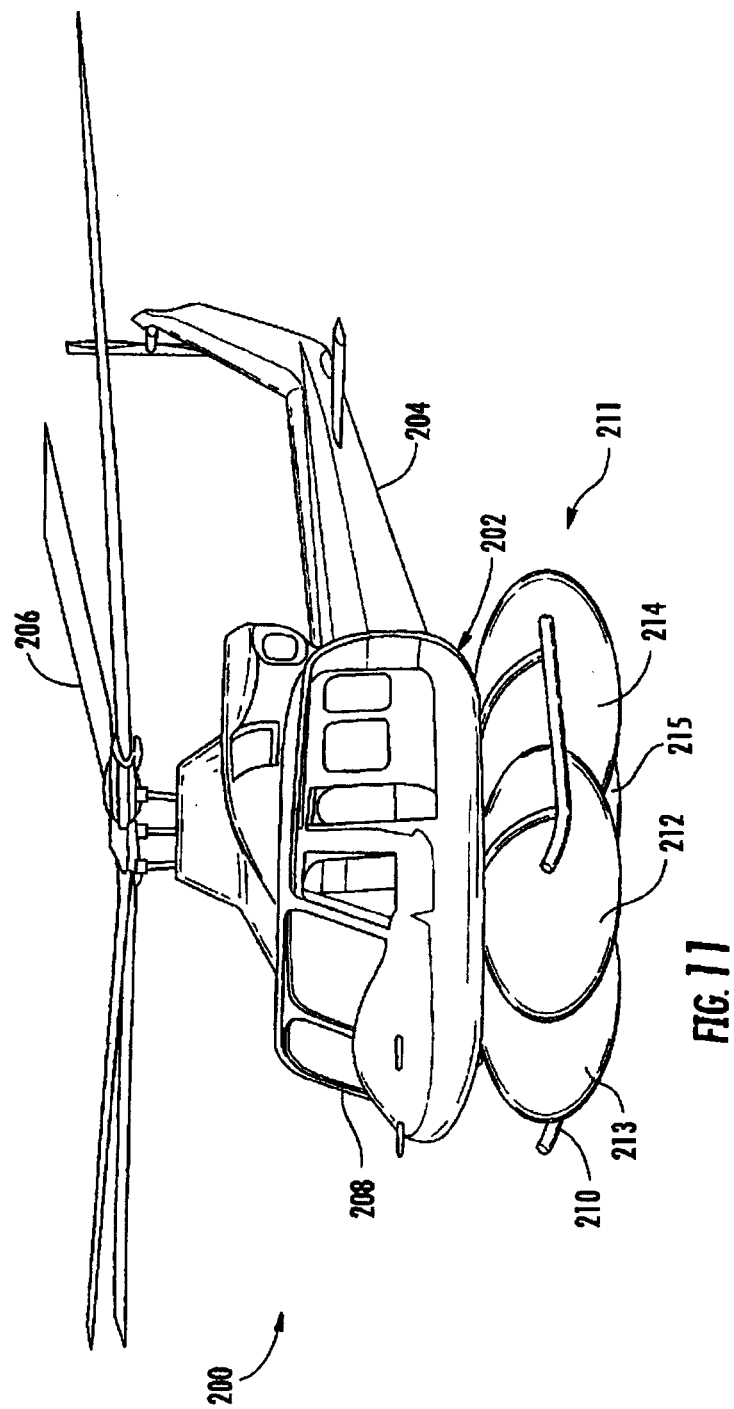

Referring next to FIG. 5, as will be discussed in greater detail below, each vent plate 124 can be selectively positioned to any position between a full open position and a full closed position. In the view shown in FIG. 5, the hatched area 127 represents the open vent area, through which gas can escape from within an airbag 112 or 114 through passage 122. The vent plate can be moved a distance A according to a desired amount of open vent area 127. The open vent area 127 will be a total open vent area "S" if there is only one vent 118; otherwise, the open vent area 127 of each vent 118 is summed to be a total vent area "S." The total vent area S is a function of crash conditions:

$$S = f(\dot{x}, \dot{z}, \theta, \phi, \dot{\theta}, \dot{\phi}, \ldots)$$

where $\dot{x}$ is represents forward velocity, $\dot{z}$ represents downward or sink velocity, $\theta$ represents pitch angle, $\phi$ represents roll angle, $\dot{\theta}$ represents pitch rate, and $\dot{\phi}$ represents roll rate.

Figure 6:
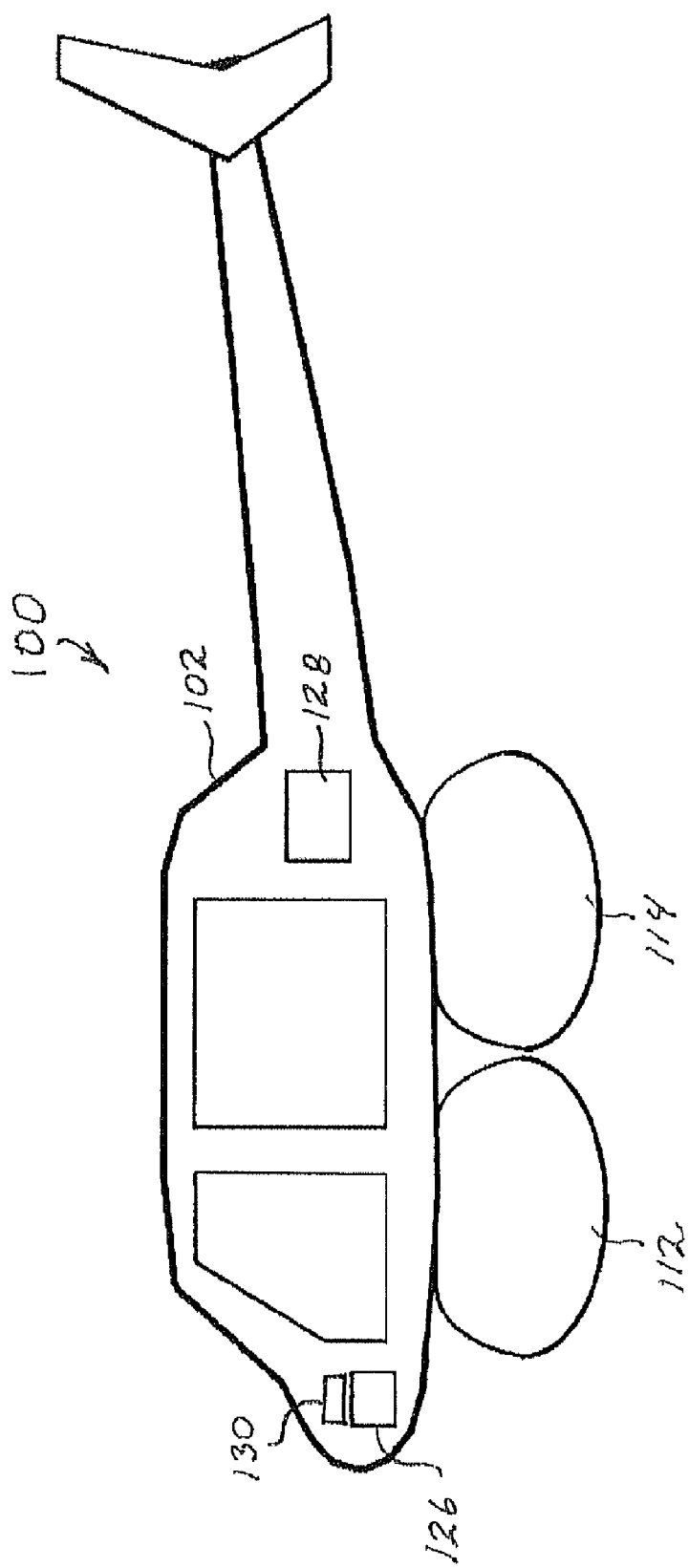
FIG. 6 is block diagram of the helicopter shown in FIG. 2.

FIG. 6 shows airbags 112 and 114 mounted to a lower portion of fuselage 102 and show additional components of the crash attenuation system according to the present disclosure. A computer-based control system 126, which is shown mounted within fuselage 102, is provided for controlling the operation of components associated with airbags 112, 114. Each airbag 112, 114 has a gas source 128, such as a gas generator, for inflation of the airbags 112, 114. In some embodiments, a secondary gas source, such as compressed gas tank (not shown), can be provided for post-crash re-inflation of airbags 112, 114 so that the airbags 112, 114 can be used as floatation devices in the event of a water landing. The gas source 128 may be of various types, such as gas-generating chemical devices or compressed air, for providing gas for inflating airbags 112, 114. In addition, the crash attenuation system has a sensor system 130 for detecting crash conditions used to determine the total vent area S, such as rate of descent and/or ground proximity. Airbags 112, 114 can also have a water-detection system (not shown), which may have sensors mounted on fuselage 102 for detecting a crash in water. Gas source 128, vent valves 120, and sensor system 130 are in communication with control system 126, allowing control system 126 to communicate with, monitor, and control the operation of these attached components. In addition, control system 126 may be in communication with a flight computer or other system for allowing the pilot to control operation of the crash attenuation system. For example, the pilot may be provided means to override, disarm, or arm the crash attenuation system.

The sensor system 130 is shown in FIG. 6 as a discrete component for the sake of convenience. However, it should be noted that actual implementations of the sensor system 130 can comprise a number of components that are located at various locations on the helicopter 100. For example, the sensor system 130 can include, for example, sensors for detecting pitch and roll attitude, pitch and roll rate, airspeed, an altitude, and rate of descent.

Figure 7:
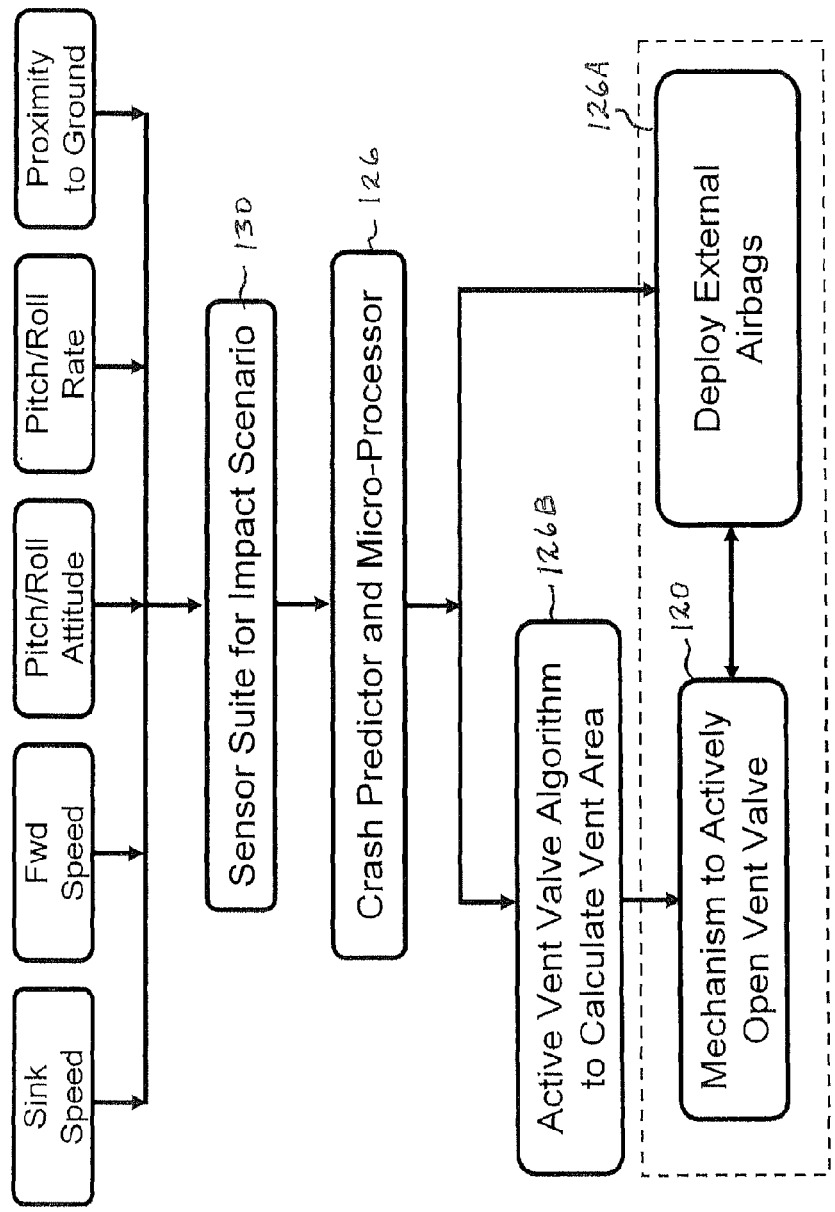
FIG. 7 is a block diagram illustrating the operation of the crash attenuation system of the helicopter shown in FIG. 2.

Referring next to FIG. 7, an exemplary embodiment of the sensor system 130 is configured to detect various crash conditions, which can include, for example, one or more of the sink speed, forward speed, pitch and roll attitude, pitch and roll rate, and proximity to the ground of the helicopter 100. The control system 126 receives data from the sensor system 130 representative of the detected crash conditions. In a preferred embodiment, the control system 126 is a microprocessor-based system configured to operate as a crash predictor. When excessive oncoming velocity of the ground within a certain altitude range is detected by the control system 126, the gas source 128 is triggered to inflate the airbags 112, 114 (indicated at box 126A) prior to impact of the helicopter 100 with the ground. At the same time, the control system 126 activates the vent valves 120 to adjust the open vent area based on an active vent valve algorithm as indicated at box 126B.

Figure 8:
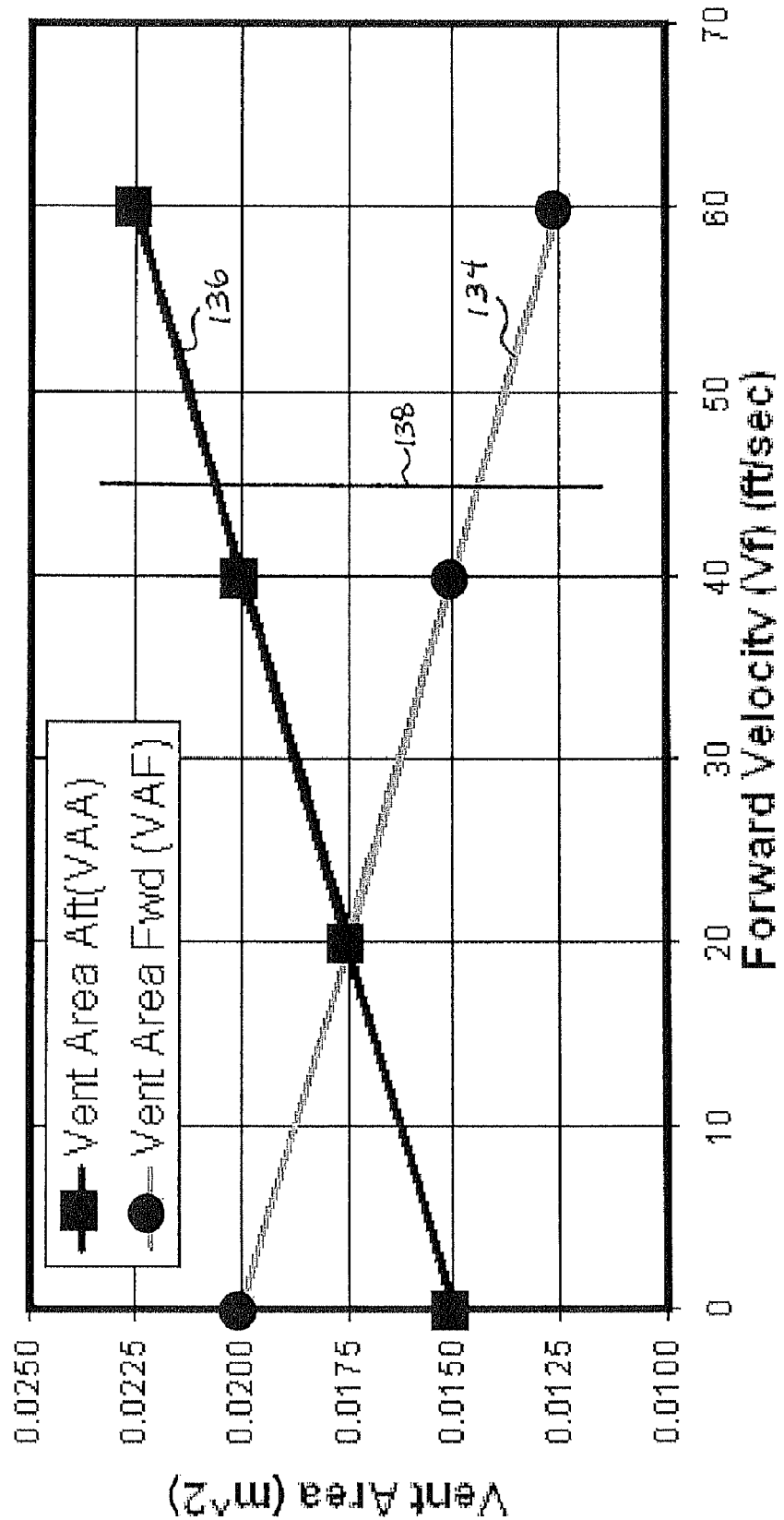
FIG. 8 shows a chart of exemplary data representative of a relationship between airspeed of the helicopter and open vent area.
Figure 9:
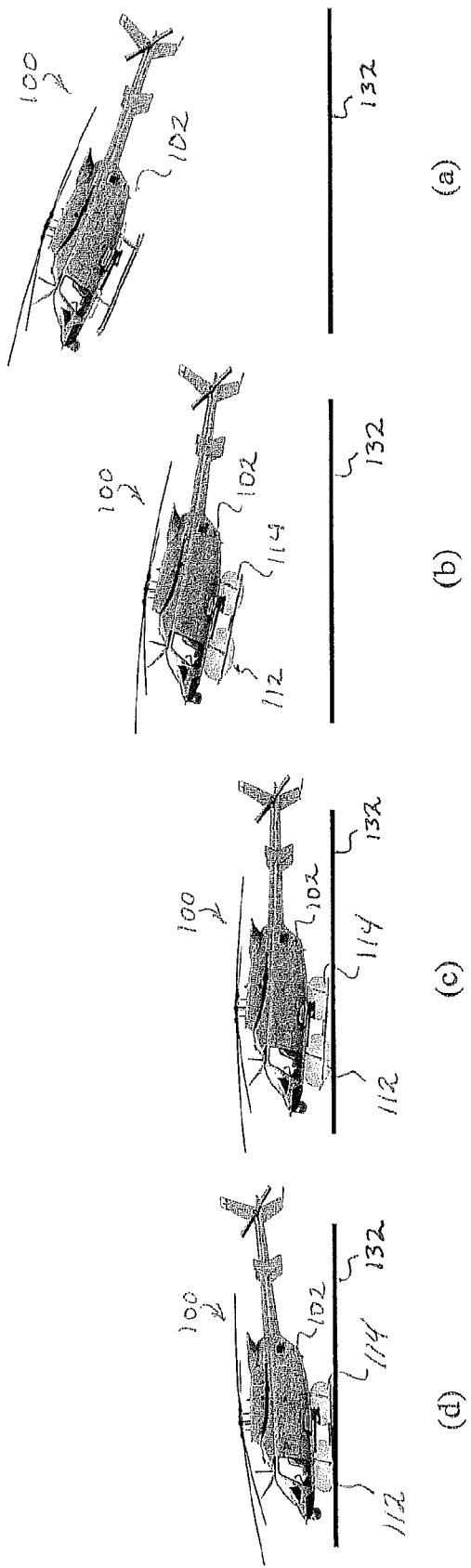
FIGS. 9a-9d show a crash sequence for a helicopter equipped with an external airbag system according to the present disclosure.

FIG. 8 shows an example of a relationship that can be used by the control system 126 for adjusting the open vent areas at 126B. In FIG. 8, a chart is shown that illustrates a relationship between open vent area and forward velocity of a helicopter for a given sink velocity of 36 feet per second. The line 134 maps open vent areas to forward velocities for the forward airbag 112, while the line 136 maps open vent areas to forward velocities for the aft airbag 114. It should be appreciated that the relationship will vary for different sink velocities. The relationship will also vary depending on a number of other factors, for example aircraft characteristics, such as aircraft weight and balance, and the number and characteristics of the airbags. The data can be determined using known flight simulation techniques, for example simulation software, for simulating crash results. Using such techniques, data can be collected based on simulation of crash results for various crash conditions and open vent areas.

FIGS. 9a through 9d illustrate operation of the crash attenuation system. In operation, if an impending crash is sensed by sensor system 130, for example, by excessive oncoming rate of the ground within a certain attitude range, control system 126 triggers gas source 128 to inflate airbags 112, 114 at the appropriate time to allow inflation just as airbags 112, 114 contact the impact surface (ground or water).

FIG. 9a shows an impending crash onto ground 132, which is sensed by the control system 126 based on data received from the sensor system 130. At FIG. 9b, gas source 128 is triggered, causing airbags 112 and 114 to inflate just prior to contact with ground 132. The control system 126 also calculates the open vent areas for each of the airbags 112, 114. In this case, the control system 126 determines that the crash conditions correspond to the line 138 shown in FIG. 8, which requires the open vent area of aft airbag 114 be greater than the open vent area of forward airbag 112. Accordingly, at FIG. 9c the open vent area of aft airbag 114 is set to an area of about 0.0205 square meters and the open vent area of forward airbag 112 is set to an area of about 0.0145 square meters. Thus, as shown in FIG. 9c, the aft airbag 114 deflates faster than the forward airbag 112. As a result, as shown at FIG. 9d, the helicopter 100 comes to a stop without experiencing a pitch-over.

Figure 10:
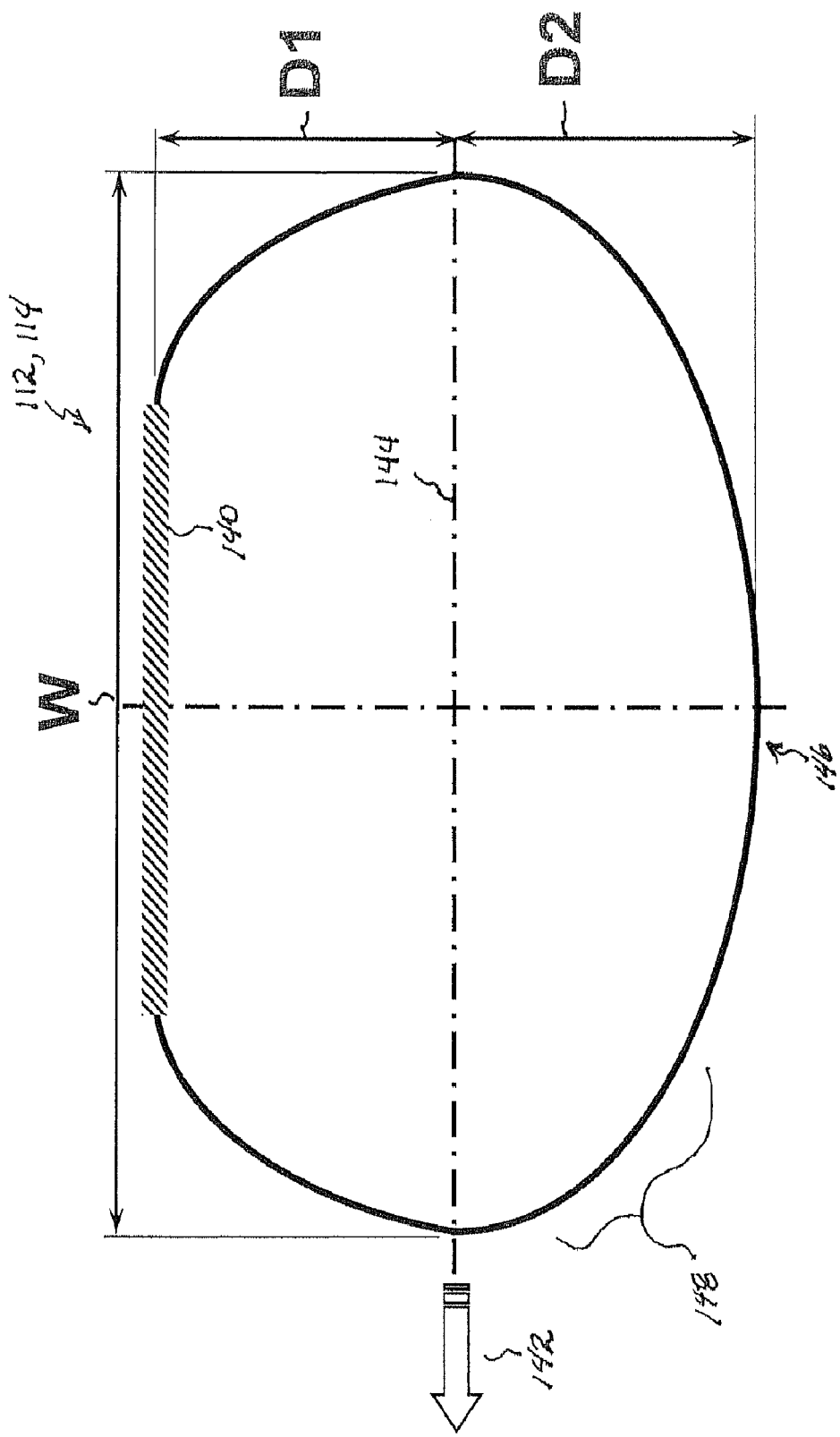
FIG. 10 shows a cross-sectional view of an airbag of the external airbag system of the present disclosure.

Referring next to FIG. 10, a cross-section of a preferred embodiment of an airbag 112, 114 is shown. The hatched area 140 represents the portion of the airbag 112, 114 that is adjacent to the underside of the fuselage 102. The arrow 142 points towards the forward end of the helicopter 100. The broken line 144 is the widest portion of the airbag 112, 114 between the top (hatched area 140) and bottom 146 of the airbag 112, 114. As shown in FIG. 10, for a width W of the airbag at line 144, the distance D1, which is the distance between the top 140 and the line 144, and the distance D2, which is the distance between the bottom 146 and the line 144, are equal and determined based on the following relationship:

$$D1, D2 = \frac{W}{2\sqrt{3}}$$

This geometry maximizes crush distance for optimal energy absorption management. Also, the curved region 148 provides anti-plow, anti-scooping geometry to assist in preventing pitch-over of the helicopter 100.

Figure 11:
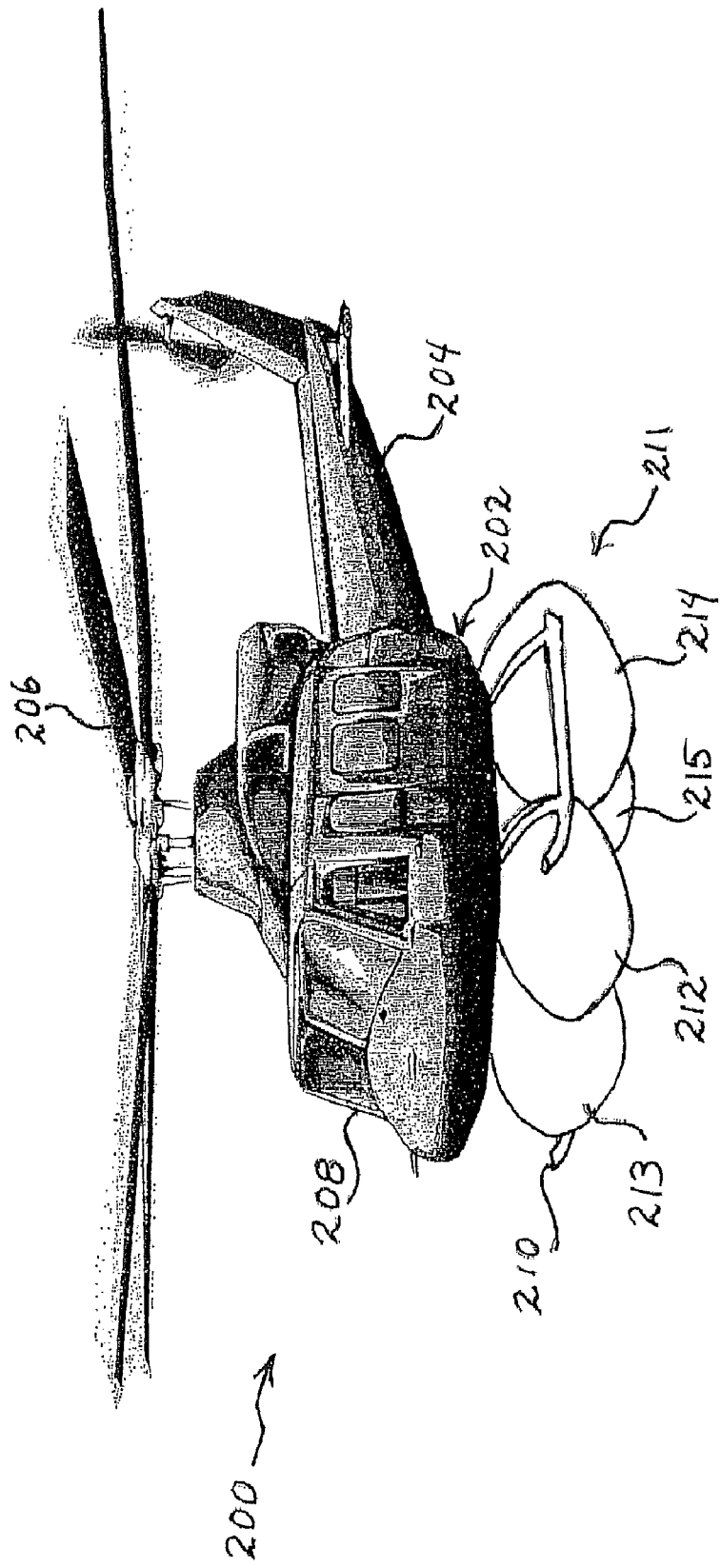
FIG. 11 shows a perspective view of a helicopter equipped with an alternative external airbag system.
Figure 2:
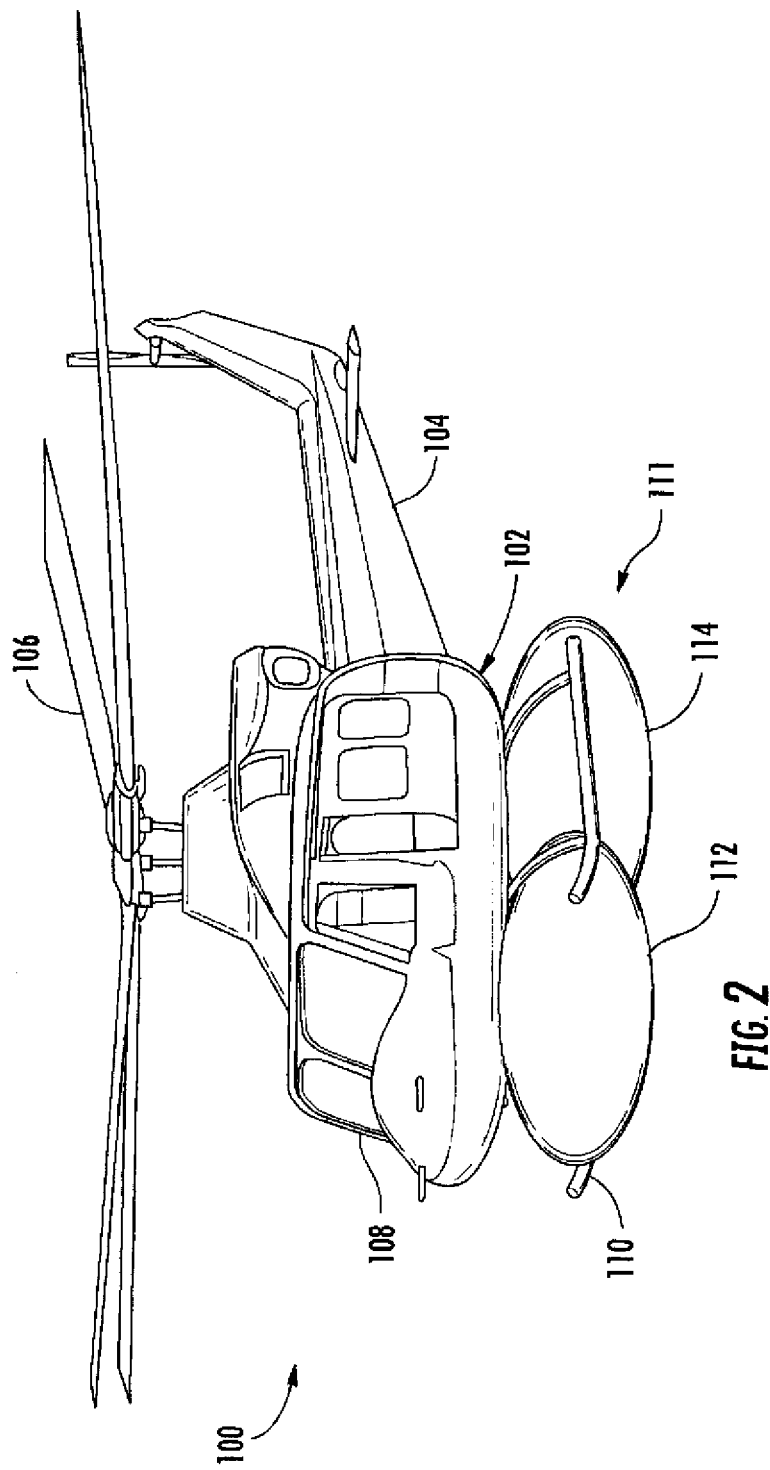

Referring next to FIG. 11, an alternative embodiment of the helicopter 200 is shown. As mentioned above, while the present crash attenuation system has been discussed primarily in connection with two airbags 112, 114, alternative embodiments can have additional airbags. For example, the helicopter 200 shown in FIG. 11 has an airbag assembly 211 comprising four airbags 212, 213, 214, and 215. Like the helicopter 100, the helicopter 200 comprises a fuselage 202 and a tail boom 204. A rotor 206 provides lift and propulsive forces for flight of helicopter 200. A pilot sits in a cockpit 208 in a forward portion of fuselage 202, and a landing skid 210 extends from a lower portion of fuselage 202 for supporting helicopter 200 on a rigid surface, such as the ground.

A problem with rotor 206 or the drive system for rotor 206 may necessitate a descent from altitude at a higher rate of speed than is desirable. If the rate is an excessively high value at impact with the ground or water, the occupants of helicopter 200 may be injured and helicopter 200 may be severely damaged by the decelerative forces exerted on helicopter 200. To reduce these forces, inflatable, non-porous airbags 212, 213, 214, and 215 are installed under fuselage 202. Though not shown in the drawings, airbags 212, 213, 214, and 215 are stored in an uninflated condition and are inflated under the control of a crash attenuation control system.

The crash attenuation system of the helicopter 200 can operate as discussed above in connection with the helicopter 100. In addition, compared to the helicopter 100, the helicopter 200 provides additional lateral roll-over prevention capabilities. Each of the airbags 212, 213, 214, and 215 is independently actively vented during a crash sequence. Thus, if the helicopter 200 is approaching the ground with a lateral velocity, the airbags 212 and 214, which are located along one side of the helicopter 200, can be vented more or less than the airbags 213 and 215, which are located along the other side of the helicopter 200, as necessary based on detected crash conditions in order to prevent the helicopter 200 from rolling over after impact with the ground.

The above disclosure describes a system and method for actively controlling the venting of external airbags based on sensed crash conditions, such as airspeed, sick speed, pitch attitude, roll attitude, pitch rate, and roll rate. This active venting of the external airbags causes different airbags located at different locations of an aircraft exterior to deflate at different rates upon impact, thereby shifting an aircraft's center of impact pressure.

While this invention has been described with reference to at least one illustrative embodiment, this description is not intended to be construed in a limiting sense. Various modifications and combinations of the illustrative embodiments, as well as other embodiments of the invention, will be apparent to persons skilled in the art upon reference to the description.

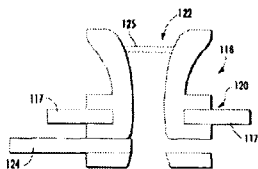

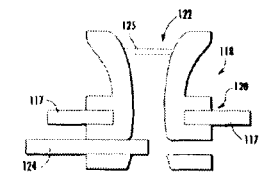

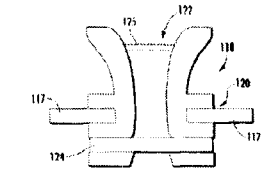

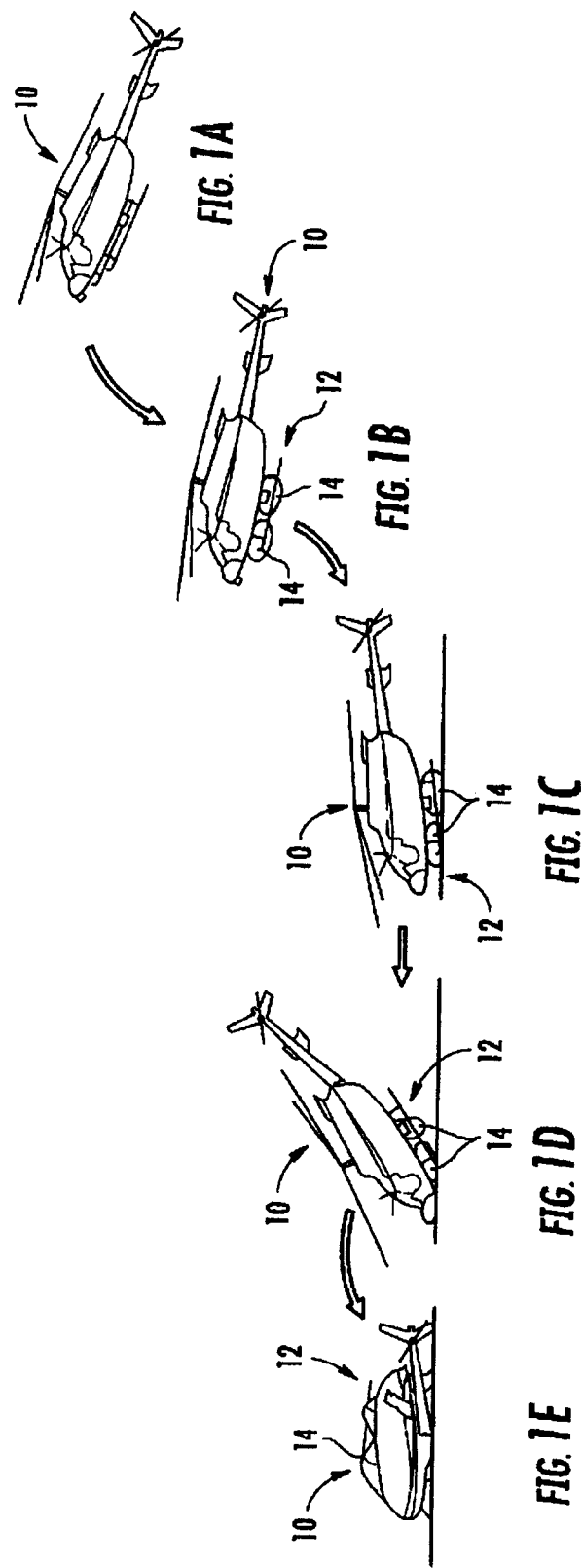

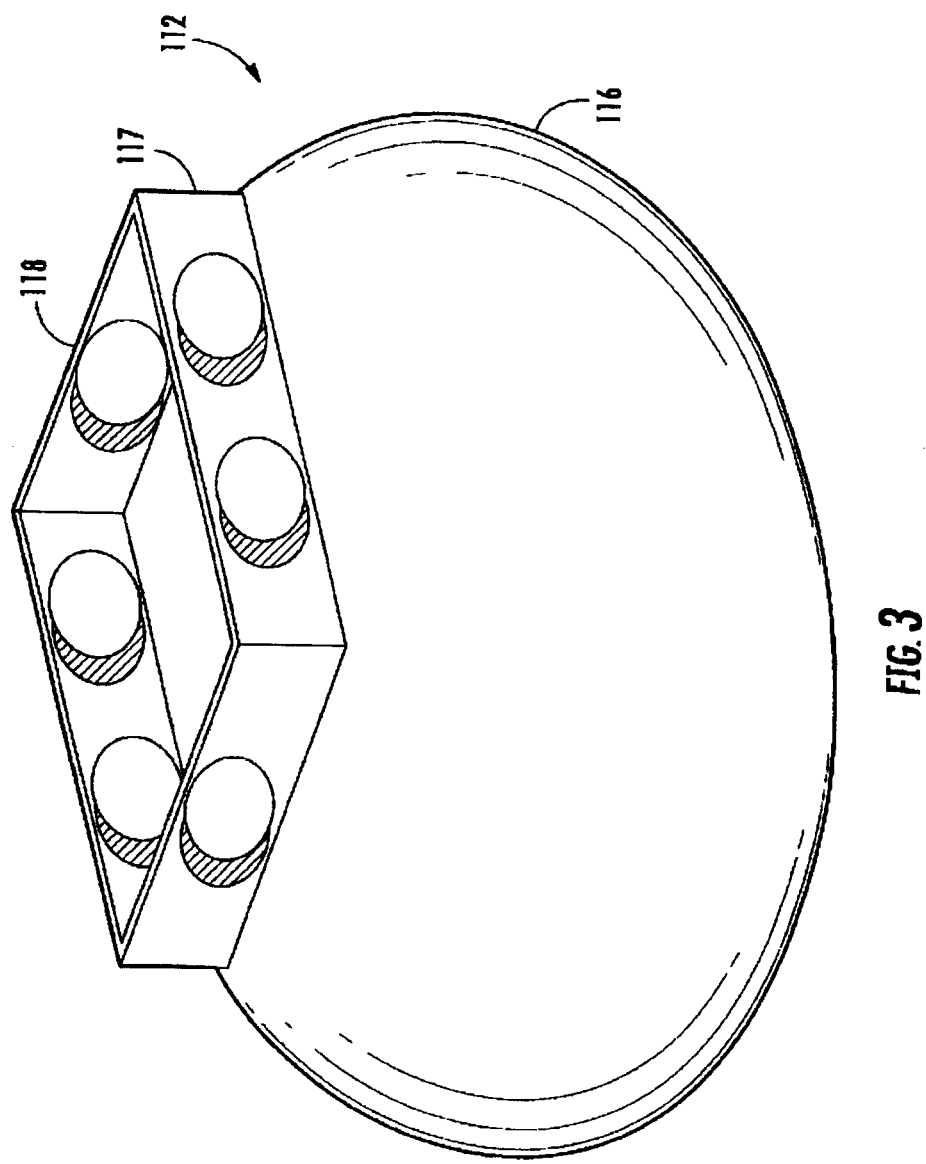

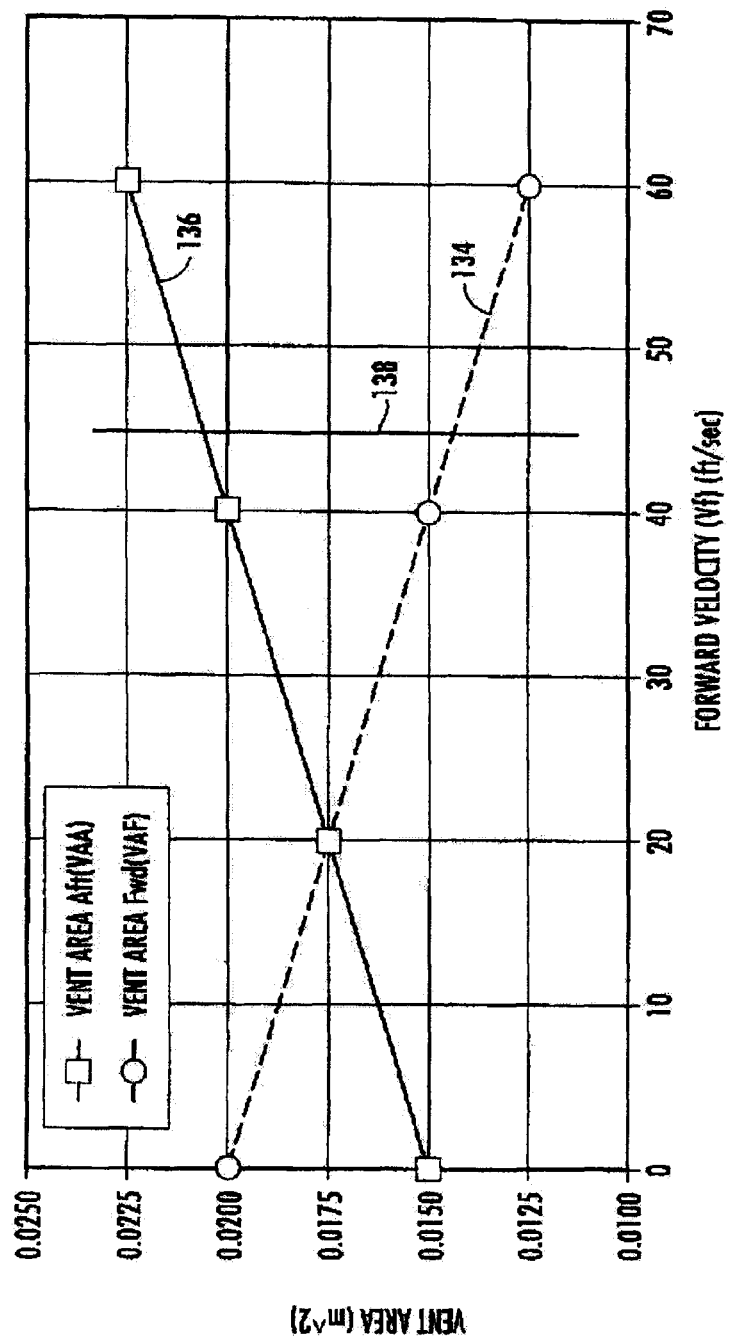

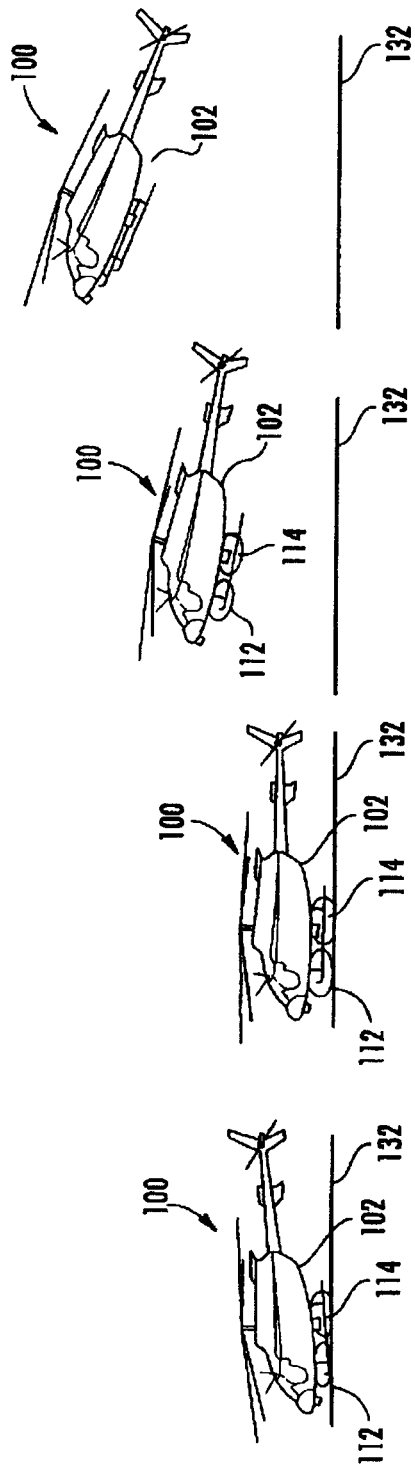

The invention claimed is:

1. A crash attenuation system for an aircraft, the system comprising:
   an airbag assembly carried by the aircraft and inflatable generally adjacent an exterior of the aircraft, the airbag assembly comprising:
      a first airbag;
      a second airbag;
      a first vent system comprising a first continuously adjustable vent area through which gas can escape from within the first airbag; and
      a second vent system comprising a second adjustable vent area through which gas can escape from within the second airbag;
      a gas source system in fluid communication with an interior of the first airbag and an interior of the second airbag for inflating the first and second airbags with gas provided by at least one gas source;
      a sensor system for detecting selected crash conditions;
      a control system for receiving data from the sensor system, the control system being configured to activate and adjust the first vent system and the second vent system at least prior to impact, based upon flight conditions, for controlling the first vent system and the second vent system being independently controlled of one another based on the detected crash conditions.

2. The crash attenuation system according to claim 1, wherein the crash conditions include at least one of a forward velocity, a vertical velocity, a pitch rate, a roll rate, a pitch attitude, and a roll attitude.

3. The crash attenuation system according to claim 1, wherein at least one of the first and second vent systems comprises a pop-off pressure release mechanism.

4. The crash attenuation system according to claim 1, wherein the first airbag is disposed more forward on the aircraft than the second airbag.

5. The crash attenuation system according to claim 1, further comprising a third airbag and a fourth airbag.

6. The crash attenuation system according to claim 1, wherein:
   the first vent system comprises a first adjustable vent valve for controlling at least a portion of the first adjustable vent area; and
   the second vent system comprises a second adjustable vent valve for controlling at least a portion of the second adjustable vent area.

7. The crash attenuation system according to claim 1, wherein the control system determines a first open vent area for the first adjustable vent area based on one or more of the detected crash conditions.

8. The crash attenuation system according to claim 7, wherein the control system determines a second open vent area for the second adjustable vent area based on one or more of the detected crash conditions.

9. The crash attenuation system according to claim 1, wherein at least one of the first and second airbags, when inflated, has a geometry that satisfies the following relationship:

$$D1 = \frac{W}{2\sqrt{3}}$$

where W is the width of the airbag at a widest portion of the airbag, and D1 is the distance from the top of the airbag to the widest portion of the airbag.

10. The crash attenuation system according to claim 9, wherein at least one of the first and second airbags, when inflated, has a geometry that satisfies the following relationship:

$$D2 = \frac{W}{2\sqrt{3}}$$

where W is the width of the airbag at a widest portion of the airbag, and D2 is the distance from the bottom of the airbag to the widest portion of the airbag.

11. A crash attenuation system for an aircraft, the system comprising:
   an airbag assembly carried by the aircraft and inflatable generally adjacent an exterior of the aircraft, the airbag assembly comprising a plurality of airbags;
   a gas source system in fluid communication with an interior of one or more of the airbags;
   a sensor system for detecting selected crash conditions; and
   a control system for controlling rate at which gas can escape from within one or more of the airbags based on the detected crash conditions, the control system activating and adjusting a vent system in communication with the airbags at least prior to impact.

12. The crash attenuation system according to claim 11, wherein the crash conditions include at least one of a forward velocity, a vertical velocity, a pitch rate, a roll rate, a pitch attitude, and a roll attitude.

13. The crash attenuation system according to claim 11, wherein at least one of the plurality of airbags includes a pop-off pressure release mechanism.

14. The crash attenuation system according to claim 11, wherein the plurality of airbags includes a first airbag and a second airbag, wherein the first airbag is disposed beneath a more forward end of the aircraft than the second airbag.

15. The crash attenuation system according to claim 14, wherein the plurality of airbags further comprising a third airbag and a fourth airbag.

16. The crash attenuation system according to claim 14, wherein:
   the first airbag comprises a first vent system, the first vent system comprising a first adjustable vent valve for controlling the rate at which gas can escape from within the first airbag; and
   the second airbag comprises a second vent system, the second vent system comprising a second adjustable vent valve for controlling the rate at which gas can escape from within the second airbag.

17. The crash attenuation system according to claim 16, wherein the control system determines a first open vent area for the first vent system based on one or more of the detected crash conditions.

18. The crash attenuation system according to claim 17, wherein the control system determines a second open vent area for the second vent system based on one or more of the detected crash conditions.

19. The crash attenuation system according to claim 11, wherein at least one of the plurality of airbags, when inflated, has a geometry that satisfies the following relationship:

$$D1 = \frac{W}{2\sqrt{3}}$$

where W is the width of the airbag at a widest portion of the airbag, and D1 is the distance from the top of the airbag to the widest portion of the airbag.

20. The crash attenuation system according to claim 19, wherein at least one of the plurality of airbags, when inflated, has a geometry that satisfies the following relationship:

$$D2 = \frac{W}{2\sqrt{3}}$$

where W is the width of the airbag at a widest portion of the airbag, and D2 is the distance from the bottom of the airbag to the widest portion of the airbag.

* * * * *

UNITED STATES PATENT AND TRADEMARK OFFICE
CERTIFICATE OF CORRECTION

PATENT NO. : 8,348,192 B2
APPLICATION NO. : 12/679563
DATED : January 8, 2013
INVENTOR(S) : Cheng-Ho Tho and Michael S. Smith It is certified that error appears in the above-identified patent and that said Letters Patent is hereby corrected as shown below:

In the drawings, Figures 1 - 11 have been printed with informal drawings. Formal drawings were provided in the parent PCT Application No.: PCT/US2007/082140 submitted 13 October 2009. Substitute the formal drawings for the informal drawings.

Signed and Sealed this
Ninth Day of April, 2013

Teresa Stanek Rea
*Acting Director of the United States Patent and Trademark Office*

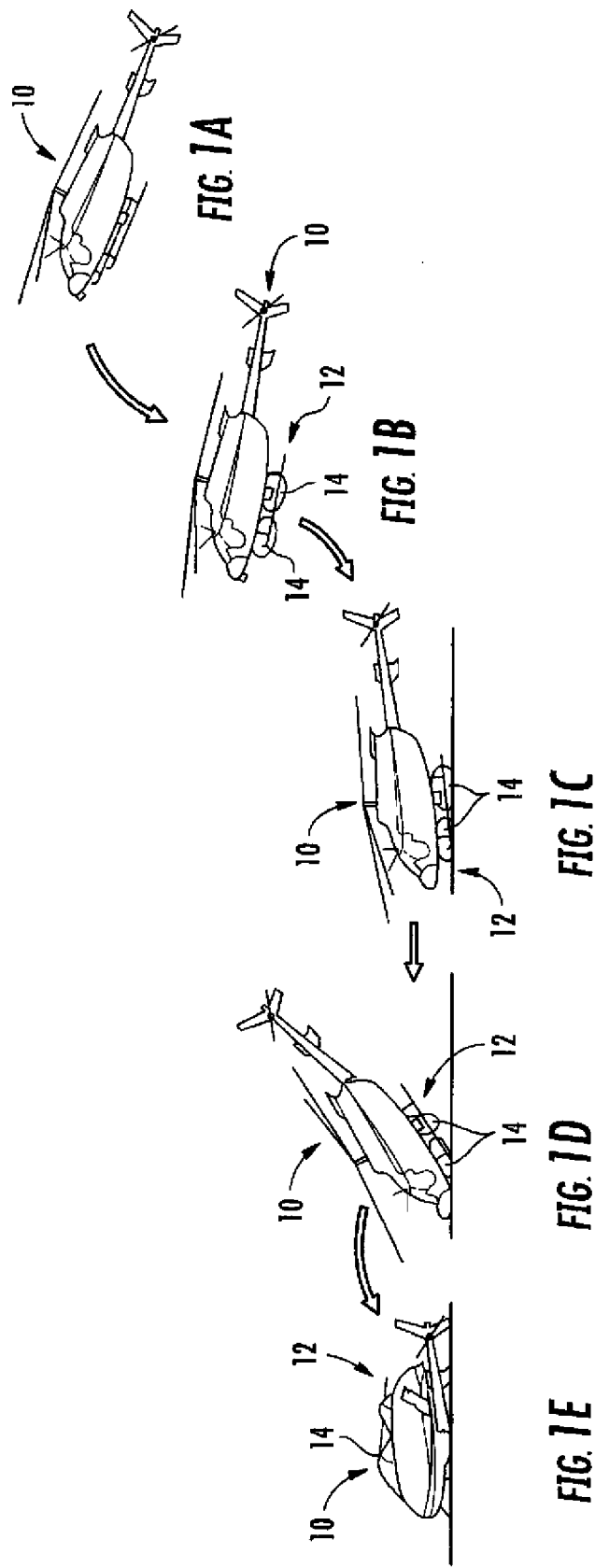

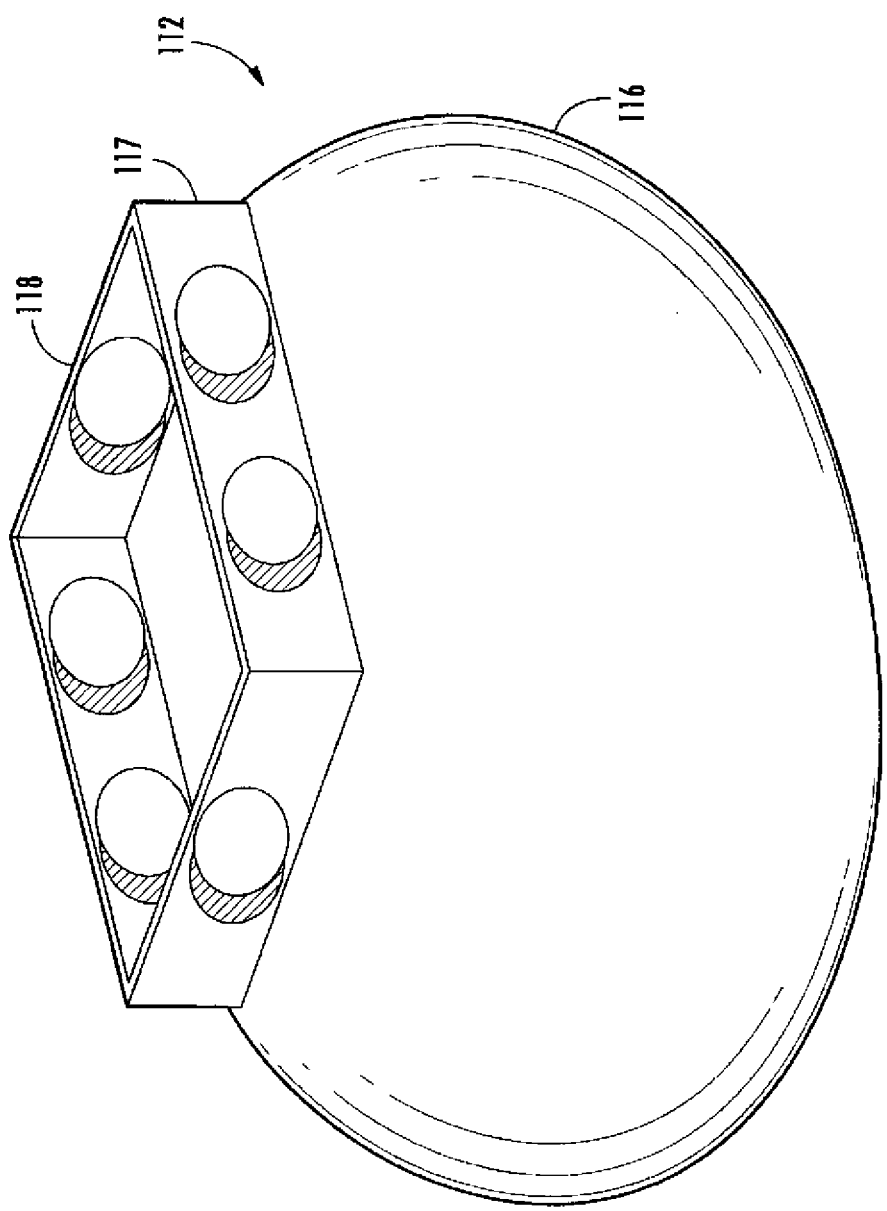

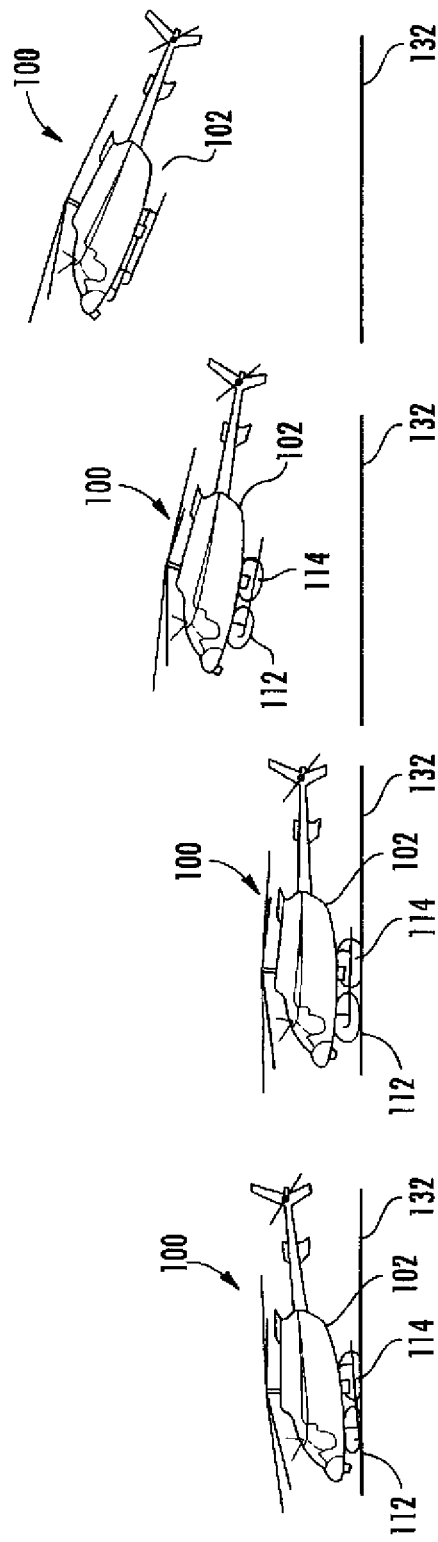

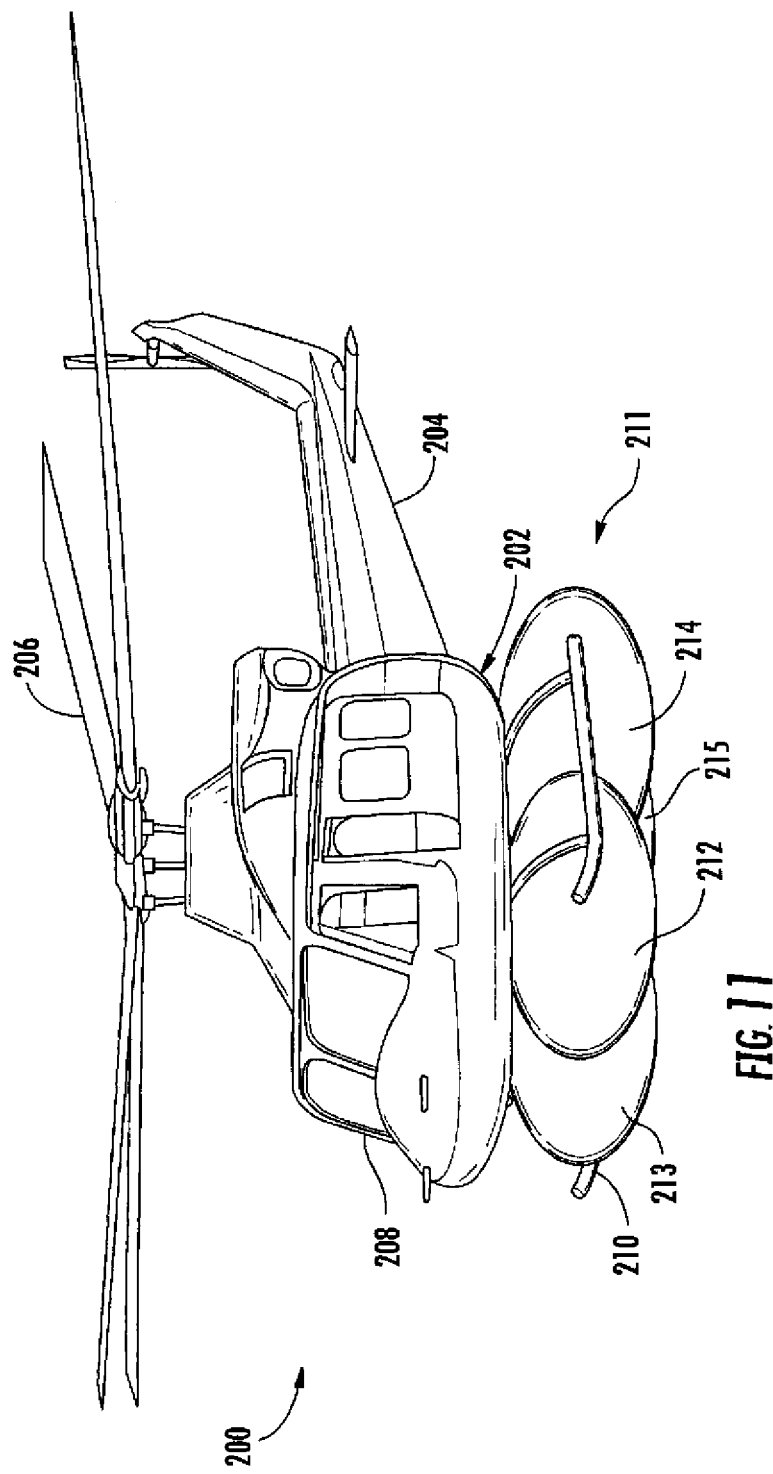

UNITED STATES PATENT AND TRADEMARK OFFICE
CERTIFICATE OF CORRECTION

PATENT NO. : 8,348,192 B2
APPLICATION NO. : 12/679563
DATED : January 8, 2013
INVENTOR(S) : Cheng-Ho Tho and Michael S. Smith It is certified that error appears in the above-identified patent and that said Letters Patent is hereby corrected as shown below:

Delete the title page and substitute therefore the attached title page consisting of corrected illustrative figure.

In the drawings, Figures 1-11 have been printed with informal drawings. Formal drawings were provided in the parent PCT Application No.: PCT/US2007/082140 submitted 13 October 2009. Substitute the formal drawings for the informal drawings.

This certificate supersedes the Certificate of Correction issued April 9, 2013.

Signed and Sealed this
Thirtieth Day of April, 2013

Teresa Stanek Rea
*Acting Director of the United States Patent and Trademark Office*

(12) United States Patent
Tho et al.

(10) Patent No.: US 8,348,192 B2
(45) Date of Patent: Jan. 8, 2013

(54) CRASH ATTENUATION SYSTEM FOR AIRCRAFT

(75) Inventors: Cheng-Ho Tho, Arlington, TX (US); Michael R. Smith, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 473 days.

(21) Appl. No.: 12/679,563

(22) PCT Filed: Oct. 22, 2007

(86) PCT No.: PCT/US2007/082140
§ 371 (c)(1), (2), (4) Date: Mar. 23, 2010

(87) PCT Pub. No.: WO2009/054844
PCT Pub. Date: Apr. 30, 2009

(65) Prior Publication Data
US 2010/0206983 A1    Aug. 19, 2010

(51) Int. Cl.
*B64C 25/56* (2006.01)
(52) U.S. Cl. ............... 244/100 A; 244/17.17; 244/139
(58) Field of Classification Search ........... 244/17.17, 244/100 A, 100 S, 107, 139, 121, 138 R
See application file for complete search history.

(56) References Cited

U.S. PATENT DOCUMENTS

| 3,602,661 A | 8/1971 | Liedberg |
| 3,990,658 A | 11/1976 | Letsinger |
| 4,004,761 A | 1/1977 | McAvoy |
| 4,032,088 A * | 6/1977 | McAvoy ............... 244/100 A |
| 4,657,516 A * | 4/1987 | Tassy ..................... 441/125 |
| 5,259,574 A | 11/1993 | Carrot |
| 5,407,150 A * | 4/1995 | Sadleir .................. 244/12.4 |
| 5,560,568 A * | 10/1996 | Schmittle ................. 244/48 |

(Continued)

FOREIGN PATENT DOCUMENTS
DE    4118300 A1    12/1992
(Continued)

OTHER PUBLICATIONS

Notification of the Decision to Grant a Patent Right for Patent for Invention issued by the Patent Office of the People's Republic of China for related Chinese Patent Application No. 200680041870.7 on Jan. 21, 2012.

(Continued)

*Primary Examiner* — Christopher P Ellis
*Assistant Examiner* — Medhat Badawi
(74) *Attorney, Agent, or Firm* — James E. Walton; J. Oliver Williams

(57) ABSTRACT

A crash attenuation system for an aircraft, the system having an airbag carried by the aircraft and inflatable generally adjacent an exterior of the aircraft. The airbag has at least one vent for releasing gas from the interior of the airbag. A gas source is in fluid communication with the interior of the airbag for inflating the airbag with gas generated provided by the first gas source. A vent valve is provided for controlling a flow of gas through each vent, each vent valve being selectively configurable between an open state, in which gas can pass through the associated vent from the interior of the airbag, any number of intermediate states, in which the vent is partially open, and a closed state, in which gas is retained within the interior of the airbag.

20 Claims, 11 Drawing Sheets